United States Patent [19]
Gudat et al.

[11] Patent Number: 5,631,658
[45] Date of Patent: *May 20, 1997

[54] METHOD AND APPARATUS FOR OPERATING GEOGRAPHY-ALTERING MACHINERY RELATIVE TO A WORK SITE

[75] Inventors: Adam J. Gudat, Edelstein; Daniel E. Henderson, Washington; Gregory R. Harrod; Karl W. Kleimenhagen, both of Peoria, all of Ill.

[73] Assignee: Caterpillar Inc., Peoria, Ill.

[*] Notice: The term of this patent shall not extend beyond the expiration date of Pat. No. 5,471,391.

[21] Appl. No.: 607,542

[22] Filed: Feb. 27, 1996

Related U.S. Application Data

[63] Continuation of Ser. No. 527,992, Sep. 13, 1995, and a continuation of Ser. No. 165,126, Dec. 8, 1993, abandoned.

[51] Int. Cl.$^6$ .............. G06F 19/00; G01S 3/02; G01S 5/02
[52] U.S. Cl. ............ 342/457; 342/357; 364/424.07; 364/449.1; 364/423.098
[58] Field of Search ............... 342/357, 457; 364/449, 424.07, 424.01; 172/4.5; 37/907

[56] References Cited

U.S. PATENT DOCUMENTS

| | | | |
|---|---|---|---|
| 4,807,131 | 2/1989 | Clegg | 364/424.01 |
| 4,915,757 | 4/1990 | Rando | 156/64 |
| 4,965,586 | 10/1990 | O'Neill | 342/357 |
| 5,148,110 | 9/1992 | Helms | 364/323 |
| 5,265,025 | 11/1993 | Hirata | 364/449 |
| 5,287,280 | 2/1994 | Yamamoto | 364/426.03 |
| 5,359,521 | 10/1994 | Kyrtsos et al. | 364/449 |
| 5,375,663 | 12/1994 | Teach | 172/4.5 |
| 5,471,391 | 11/1995 | Gudat et al. | 364/424.07 |

FOREIGN PATENT DOCUMENTS

| | | |
|---|---|---|
| 0139292 | 10/1984 | European Pat. Off. |
| 0297811 | 6/1988 | European Pat. Off. |
| 4133392 | 10/1991 | Germany |
| 59-021835 | 3/1984 | Japan |
| 64-174247 | 7/1989 | Japan |

OTHER PUBLICATIONS

"Geolink Moves Mapping Into a Whole New Field: Yours", Geo Research Brochure.
"Super Distance Unmanned Heavy Equipment System", Aug. 1993.
Agtek Advanced Grade Technology.
Agtek Advanced Grade Technology Brochure.
Arnex Navigation Systems AB.
ASCENDE nt, Windows of Opportunity.
Caterpillar World, May 1993, pp. 1–7.
Design News, Aug. 2, 1993, pp. 27–28.

(List continued on next page.)

*Primary Examiner*—Gregory C. Issing
*Attorney, Agent, or Firm*—Jason J. Young; James R. Yee

[57] ABSTRACT

A method and apparatus for operating geography-altering machinery such as a track-type tractor, road grader, paver or the like relative to a work site to alter the geography of the site toward a desired condition. A first digital three-dimensional model of the desired site geography, and a second digital three-dimensional model of the actual site geography are stored in a digital data storage facility. The machine is equipped with a position receiver to determine in three-dimensional space the location of the machine relative to the site. A dynamic database receives the machine position information, determines the difference between the first and second site models and generates representational signals of that difference for directing the operation of the machine to bring the actual site geography into conformity with the desired site geography. In one embodiment, the signals representing the machine position and the difference between the first and second site models used to generate an operator display which is updated in real time. Alternately, the signals representing the difference between the first and second site models can be supplied to automatic machine controls for autonomous or semi-autonomous operation of the machine.

81 Claims, 14 Drawing Sheets

OTHER PUBLICATIONS

Design News, Oct. 18, 1993 "Waging War on Radioactive Refuse" pp. 78–94.

GPS World Newsletter, Oct. 28, 1993.

Greenspun Report.

ILS Inc. DataWeigh System.

ILS Today, May 17, 1993.

Image Systems Technology, Inc. Rasterware Specifications, May 1993.

Information Technology, Oct. 18, 1993, p. 96.

International Search Report for PCT US 94/12733, Apr. 11, 1994.

Leica Wild GPS–System 200 Brochure.

Modular Mining Systems, pp. 17–20.

Pulsearch Navigation Systems.

Real–Time Locating for Remove Sensing, Jul. 1993, p. 26.

S. Carey, Wall Street Journal "Sextants in Space Can Change the World".

Spectra–Physics Laserplane.

Spectra–Physics Laserplane Brochure.

Techbase, Engineering Software for Solving Real–World Problems.

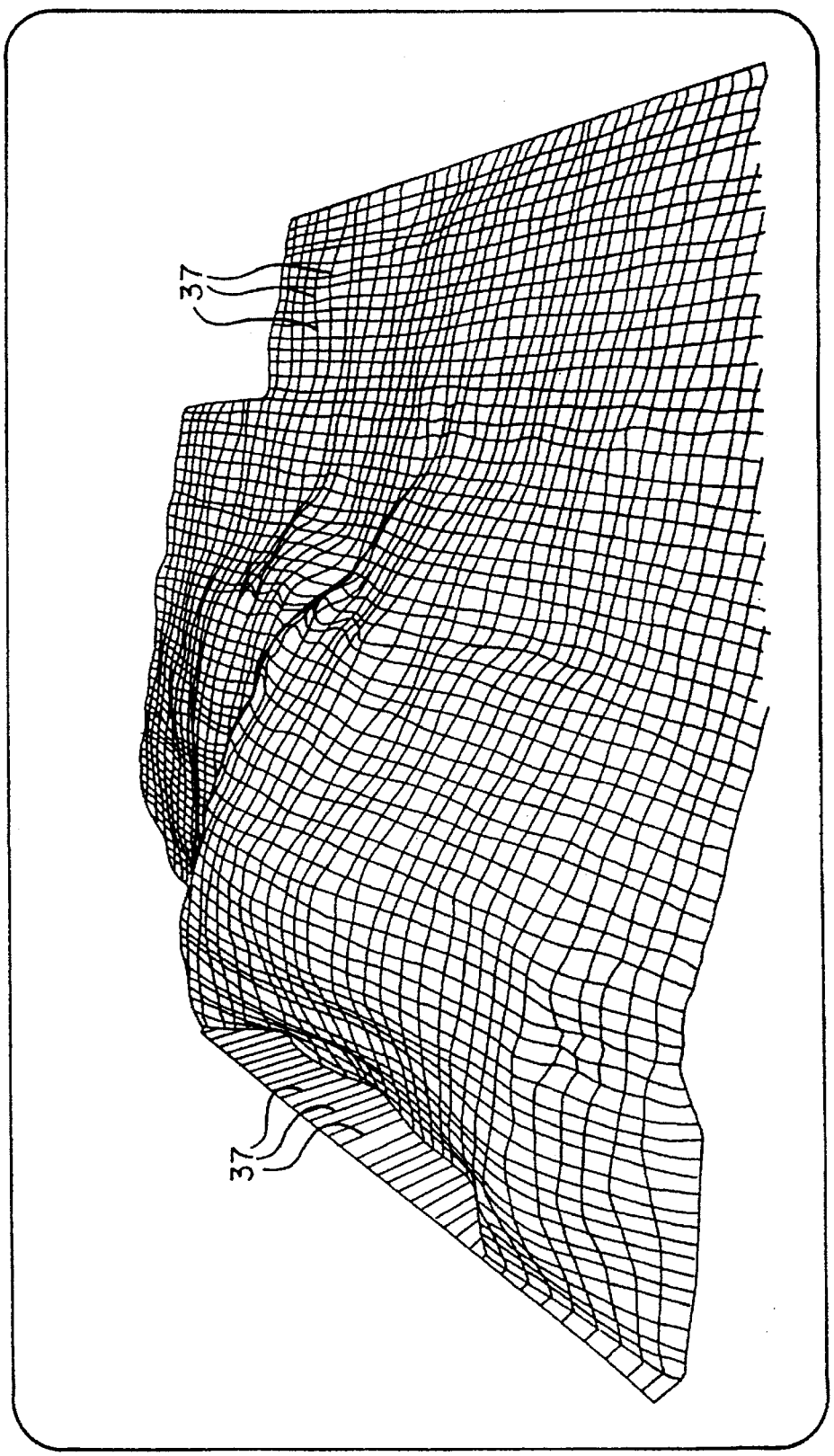

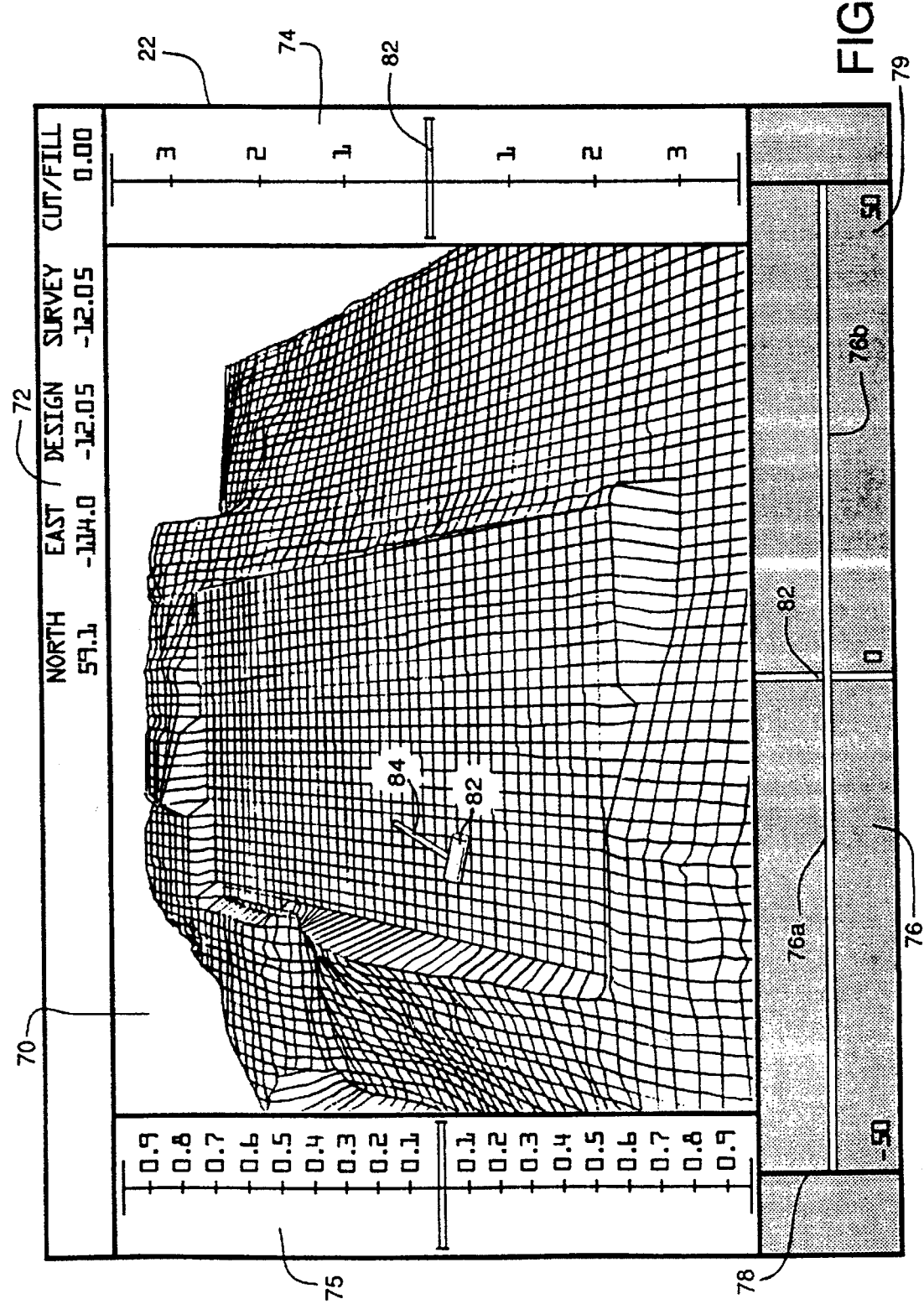

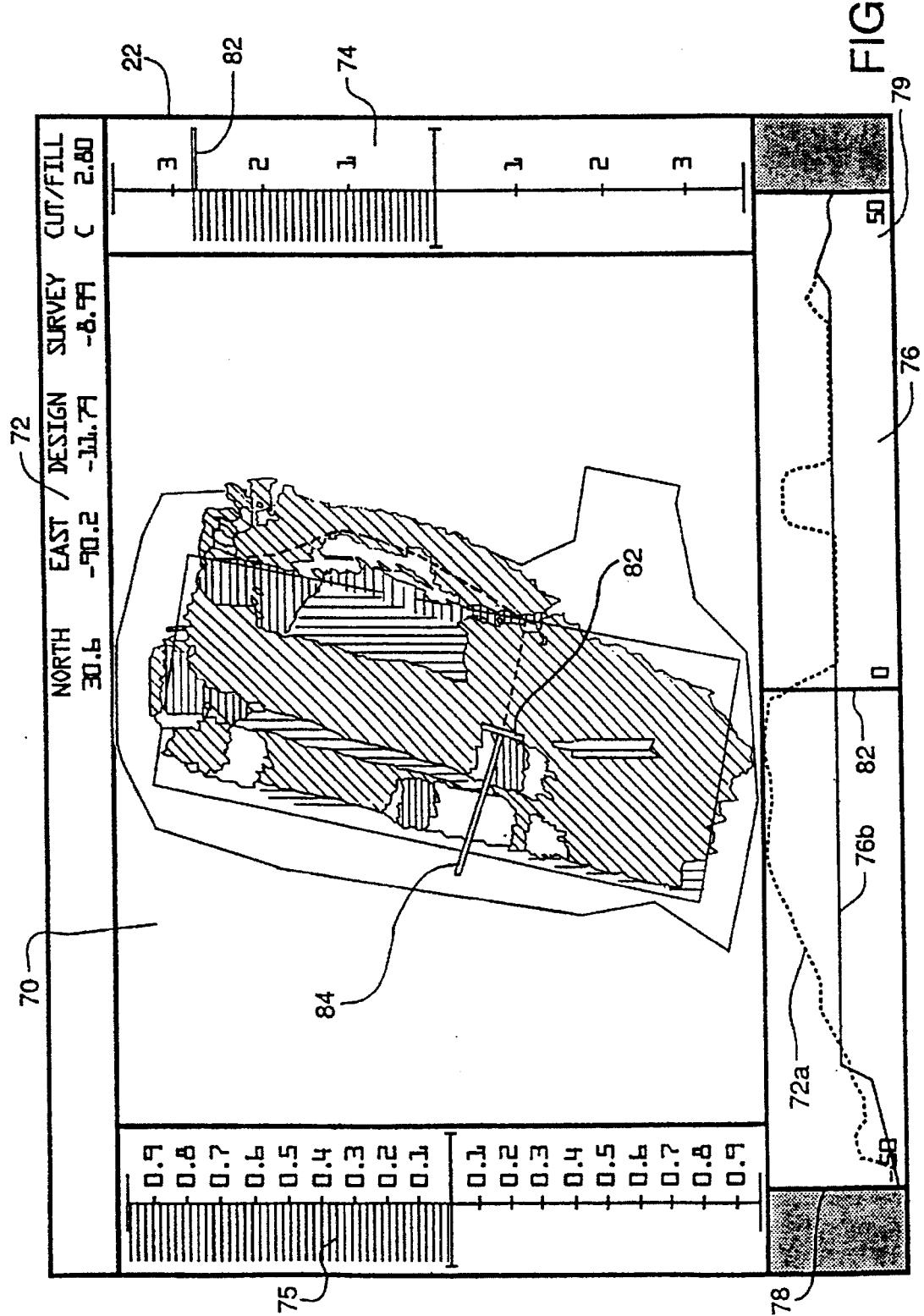

METHOD AND APPARATUS FOR OPERATING GEOGRAPHY-ALTERING MACHINERY RELATIVE TO A WORK SITE

This is a continuation application of application Ser. No. 08/527,992, filed Sep. 13, 1995, which is a file wrapper continuation application of application Ser. No. 08/165,126 filed on Dec. 8, 1993 now abandoned.

FIELD OF THE INVENTION

This invention relates to the operation of machinery for altering the geography of a work site and, more particularly, to the real time generation and use of digital data which collectively represents the geography of the work site as it is being altered by the machinery toward a desired state.

As used in this patent specification the phrase "geography altering machinery" and various approximations thereof refer to self-propelled mobile machines such as track-type tractors, road graders, pavers and asphalt layers which exhibit both (1) mobility over or through a work site as a result of being provided with a prime mover (for example an engine) on a frame which drives wheels or tracks supporting the frame, and (2) the capacity to alter the geography of a work site as a consequence of the provision on the frame of a tool or tool set such as a blade, shovel, bucket, ripper or the like. Machinery such as track-type tractors, graders, pavers and asphalt layers is typically referred to as "earth moving machinery or equipment" and it is to be understood that these machines constitute a subcategory of the geography altering machinery with which this invention deals.

BACKGROUND OF THE INVENTION

Despite the development of sophisticated and powerful earthmoving machinery it remains a time consuming and labor intensive chore to recontour the topography of a large plot of land, or to otherwise alter the geography of a work site such as a construction area, mine, road or the like. Such operations sometimes involve the necessity of a survey which is currently carried out using line of sight optical instruments or other static, point-by-point measuring techniques to obtain the coordinates of a large number of points over the work site and to thereafter construct a three-dimensional model of the site. From the survey an architectural plan or target geography is developed. Thereafter the site is carefully marked with stakes of various colors to provide physical cues to the operator of geography altering machinery such as a tracktype tractor as to how the machine should be operated to transform the work site from the original to the desired state. Only the most skillful and experienced operators can achieve efficiency in recontouring a large land site, such difficulty being due in part to the absence of large scale as well as detailed information as to the progress being made in the revision of the site.

As a result most projects involving the alteration of the geography of large work sites are time consuming and labor intensive in the requirements for skilled personnel and large crews to direct the operation of earthmoving machinery and the like.

Additionally, for knowledge of the degree to which the original site geography has been brought into conformity with the desired geography, the operation is often interrupted while a survey crew verifies the amount of progress to date and manually updates the staking and marking of the site, as well as the site model. Between these occasional verifications the machinery operators and supervisors have no truly accurate way to measure their real time progress.

SUMMARY DISCLOSURE OF THE INVENTION

The invention provides a solution to the long standing problems of operating machinery to accurately and efficiently alter the geography of a work site toward the desired condition. The subject invention achieves such geography alteration without the need for physical markers on the site to cue the operator, with only such interruptions in operation as are needed, for example, to refuel the machinery, and with a minimum need for crew.

In general this is accomplished through the provision of a digital data storage, retrieval and process facility which per se may be carried on the mobile machinery or located remotely from the machinery but connected, for example, by radio link to the machinery for storing, actually creating, and modifying a digital three-dimensional model of the site as it exists at any given time, as well as a digital model of the site as an architect, for example, wishes it to be.

The subject invention further comprises a mechanism by which the exact position in three-dimensional space of the mobile machine, or in certain cases the earth-contacting implement which is carried by the machine, can be accurately determined in real time; i.e., as it alters the geography of the site thereby to update the digital three-dimensional model, point by point and in real time as the machinery travels over or through it. As hereinafter described the preferred implementation of the invention involves the use of a phase differential GPS (global positioning system) receiver system which is capable of precisely locating an object in three-dimensional space to centimeter accuracy.

The subject invention further comprises means for comparing the desired digital three-dimensional site model to the continuously updated actual digital three-dimensional site model and for generating signals representing the degree of alteration needed at each of a large number of coordinates over or through the work site to bring the actual model into conformity with the desired model. These signals may in one instance provide real time displays on or off the machinery to cue the operator as to the machine's actual progress in real time and within a frame of reference which conveys information as to at least a substantial portion of the overall site. In another embodiment hereinafter described the signals representing the differences between the desired and actual three-dimensional models are applied to the real time automatic controls of the machine itself or a portion thereof or both.

In a preferred form at least a portion of the position-determining mechanism or system is carried on the machine itself as it traverses the site. Where the machine includes a separate earth-contacting implement, the position-determining system may be mounted on the implement itself. Where the implement is itself movable relative to the machine frame or carriage, for example a hydraulically-activated blade, bucket, or scraper, the implement can be provided with means to determine its elevation relative to the surface of the site.

According to another aspect of the invention a method is provided for directing the operations of a mobile geography-altering machine which comprises the steps of producing and storing in a digital data storage and retrieval means a first three-dimensional geographic site model representing the desired geography of a site and a second three-dimensional geographic site model representing the actual geography of the site, thereafter generating digital signals representing in real time the instantaneous position in three-dimensional space of a mobile geography-altering machine or an implement carried thereby as it traverses and alters the site, utilizing the digital signals to update the second model, determining the difference between the first model and the updated second model and directing the operations of the machine in accordance with the difference to bring the updated second model into conformity with the first model.

In one embodiment the step of directing the operation of the machine is carried out by providing to a machine operator a display which informs the operator in real time of the instantaneous position of the mobile machine relative to the work site, the alterations which are needed to bring the site into conformity with the first three-dimensional model, and the actual progress being made toward the realization of the first model.

In another embodiment the step of directing the operations of the machine is carried out in an automatic or semi-automatic fashion by actually working through electrohydraulic actuators to control the position, elevation and direction of movement of the machine and/or the earth altering tool carried thereby.

In a preferred form at least a portion of the position-determining means is carried on the machine itself as it traverses the site. Where the machine includes a separate earth-contacting implement, the position-determining system may be mounted on the implement itself. Where the implement is itself movable relative to the machine frame or carriage, the implement can be provided with means to determine its elevation relative to the surface of the site.

As hereinafter made more explicit, both the apparatus and the method aspects of the present invention can be achieved in various ways; for example, the digital data storage and retrieval facility as well as the updating and differencing means may be carried by and on the machine as part of an integral and comprehensive on-board machine system. Alternately these means may be located at an off site or nearby facility for transmitting visual display signals or automatic control signals to the machine and for receiving updated position and site information from the machine during operation thereof.

As hereinafter described in detail the geography-altering machine may be earth-moving equipment such as a track-type tractor, grader, paver or asphalt layer. The machine may also be capable of underground or in ground operations such as the mobile machinery found in open pit or below ground mining operations, depending on the capabilities of the positioning system used.

In the preferred form the method and apparatus aspects of the invention are realized through the utilization of three-dimensional position information derived from global positioning satellites using a phase differential GPS receiver system. Such GPS receivers utilize signals from global positioning satellites as well as a differential signal from a local reference receiver of known position coordinates to generate position coordinate data to centimeter accuracy. Accordingly, the apparatus used to carry out the invention in the preferred form comprises a GPS receiver having both GPS and local signal reception capabilities and, where a local reference signal at a geodetically surveyed site is not available, a temporary surveyed differential receiver/transmitter to provide the local data processing apparatus with a correction signal. Alternately, raw position data can be transmitted from the reference receiver to the local data processor for comparison and correction with the information from the machine-mounted receiver.

According to another aspect of the invention means are provided for precisely generating and controlling displays which are suitable for use in performing operations to alter the geography of sites such as construction sites, mines, and roads so as to precisely display the progress being made by the mobile machine on an incremental basis wherein the display unit areas may or may not correspond to the sampling rate of the GPS receiver and digital processor system. As hereinafter described, the site, or a practically displayable portion thereof, is subdivided into a continuous matrix of unit areas of such size that the mobile machine may traverse these unit areas at a rate which is greater than the sampling rate of the GPS receiver and data processing facility. Algorithms are provided which take into account the physical parameters and dimensions of the earth-altering tool or implements and the relationship thereof to the physical machine and its path of travel. The unit areas of the display are filled in, colored, revised or otherwise altered in accordance with progress information derived from the GPS receiver or other positioning system and the digital processing facility, in accordance with the hereinafter described laws of the algorithm which is in residence in the digital processing facility.

In one embodiment of the invention the real-time path of the machine relative to the site between position readings is determined with a differencing algorithm which determines an effective width of a geography-altering portion of the machine less than or equal to its actual width, and updates each portion of the site model which the effective width traverses. In a preferred form, the instantaneous position of the machine as it traverses the site is tracked as a series of coordinate points on the site model. Where the rate at which the coordinate points are tracked is not synchronous with the rate of travel of the machine over the unit areas or grid elements of the site, the differencing algorithm determines the unit areas traversed by the geography-altering portion of the machine between coordinate points. Where the geography-altering portion is of a continuous width, for example a blade or scraper element, the effective parameters of the blade are preferably set less than its actual parameters to ensure that only those portions of the site actually operated on by the blade are filled in, colored, revised or otherwise altered or marked to reflect the alterations to the site and the current difference between the actual and desired site models.

As will be made more clear, an initial site survey may be created in a variety of ways so as to constitute the first three-dimensional geographic site model. In one embodiment or utilization of the invention the first model may be created using standard state-of-the-art site surveying methods and thereafter the data from such state-of-the-art survey digitized in accordance with the physical and data processing requirements of the particular digitizing and data processing system used. Alternatively the actual site geography model may be created by traversing the site with the geography-altering machine itself or through the use of special machinery and/or vehicles which are suited to the conditions. For example, a smooth, relatively refined topographical site may be traversed by a pickup truck whereas a less refined or more rugged site may require a special vehicle or even a receiver, digitizing and/or storage facility carried by a person who traverses the site on foot. In another alternative a particularly difficult site may be surveyed by air using stereo photography or holography equipment. In a still further alternative, underground geology may be surveyed by or through the making of numerous core samples at various locations and at various depths in constructing underground site model from such samples.

BRIEF DESCRIPTION OF THE DRAWINGS

FIGS. 5A-5B are graphic reproductions of exemplary digitized site models such as used with the present invention;

FIGS. 6A-6D are representative real-time operator displays generated according to the present invention for an earth contouring operation as in FIG. 4;

DETAILED DESCRIPTION OF THE ILLUSTRATED EMBODIMENTS

Figure 1:
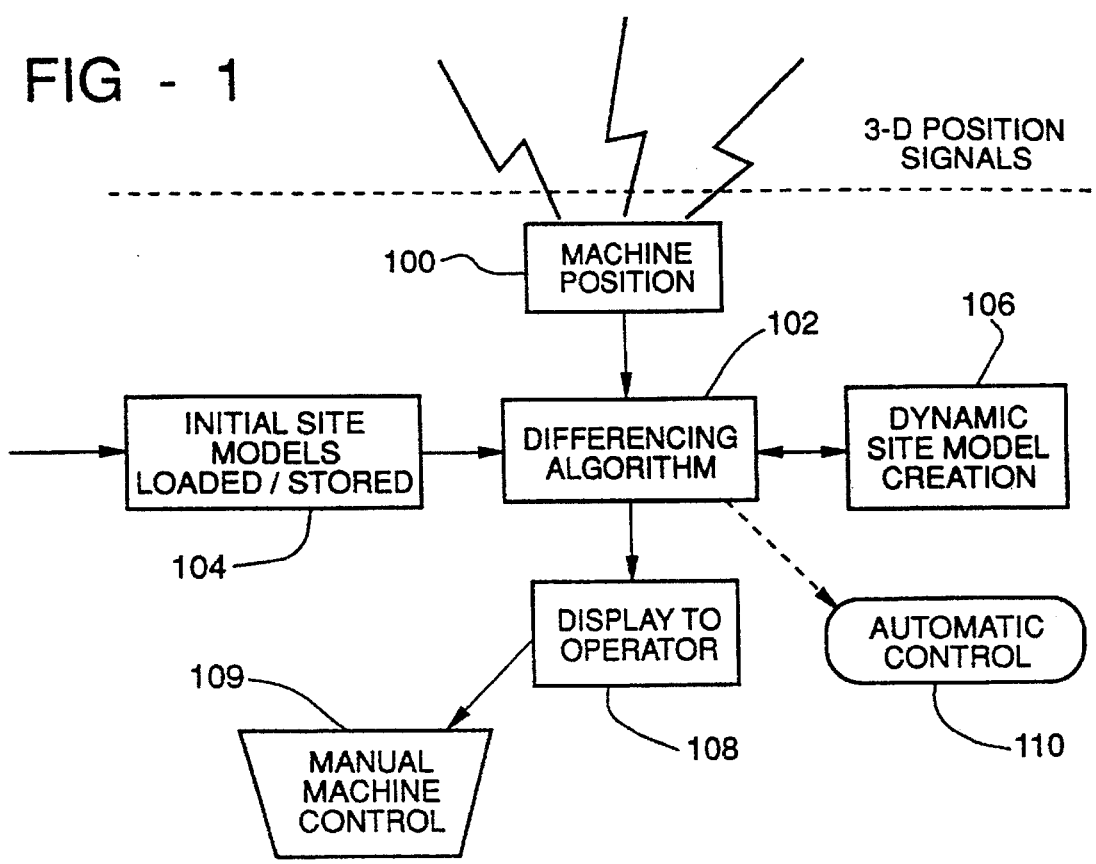
FIG. 1 is a schematic representation of a machinery position and control method according to the present invention.

Referring to FIG. 1, the method of the present invention is shown schematically. Using a known three-dimensional positioning system with an external reference, for example (but not limited to) 3-D laser, GPS, GPS/laser combinations or radar, machine or tool position coordinates are determined in block 100 as the machine moves over the site. These coordinates are instantaneously supplied as a series of discrete points to a differencing algorithm at 102. The differencing algorithm calculates the machine position and path in real time. Digitized models of the actual and desired site geographies are loaded or stored at block 104, an accessible digital storage and retrieval facility, for example a local digital computer. The differencing algorithm 102 retrieves, manipulates and updates the site models from 104 and generates at 106 a dynamic site database of the difference between the actual site and the desired site model, updating the actual site model in real-time as new position information is received from block 100. This dynamically updated site model is then made available to the operator in display step 108, providing real time position, direction and site geography/topography updates in human readable form. Using the information from the display the operator can efficiently monitor and direct the manual control of the machine at 109.

Additionally, or alternately, the dynamic update information can be provided to an automatic machine control system at 110, for example an electrohydraulic control system of the type developed by Caterpillar Inc. and used to operate the various pumps, valves, hydraulic cylinders, motor/steering mechanisms and other controls used in geography-altering machinery. The electrohydraulic controls can provide an operator assist to minimize machine work and limit the manual controls if the operator's proposed action would, for example, overload the machine. Alternately, the site update information from the dynamic database can be used to provide fully automatic machine/tool control.

It will be clear from the foregoing that with the present method the initial, actual site geography/topography model can be generated by the machine itself on previously unsurveyed terrain. By simply moving the machine over a proposed site in a regular pattern, the geography of the site can be determined relative to the desired architect's site model loaded at 104. After the machine has traversed the entire site to accurately determine its actual geography, the actual site model can then be monitored and updated in real time at 106 as the machine brings the actual geography into conformity with the desired site model.

Figure 2:
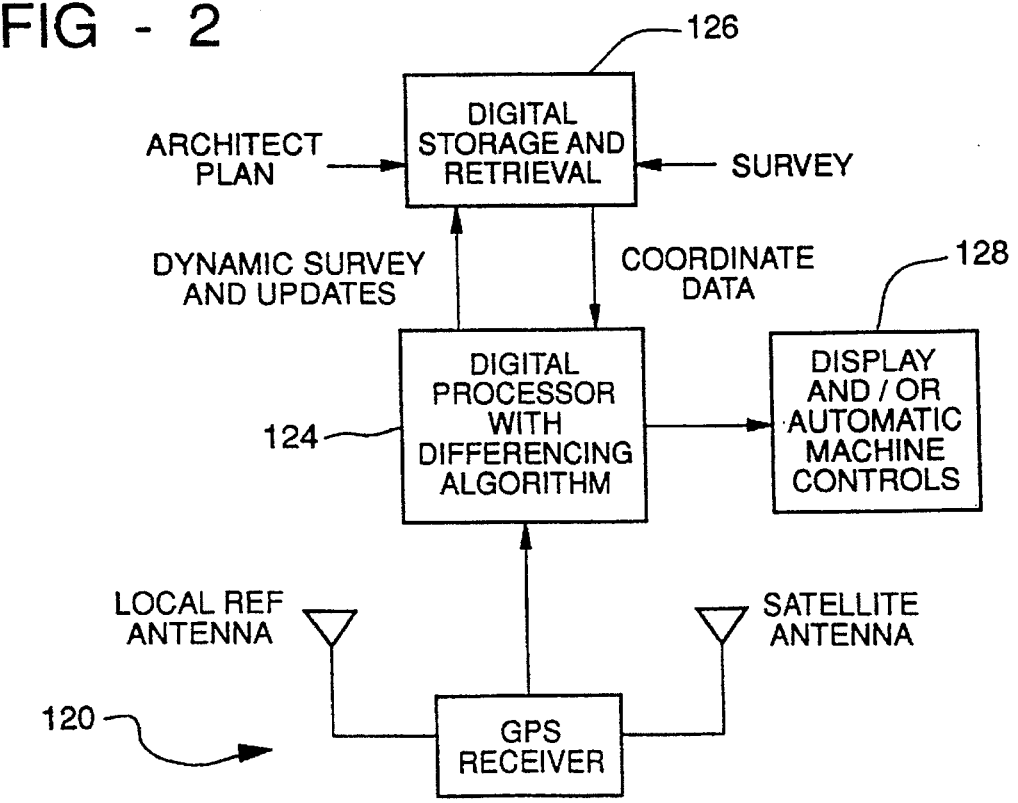
FIG. 2 is a schematic representation of an apparatus which can be used in connection with the receipt and processing of GPS signals to carry out the present invention.

Referring now to FIG. 2, an apparatus which can be used in connection with the receipt and processing of GPS signals to carry out the present invention is shown in block diagram form comprising a GPS receiver apparatus 120 with a local reference antenna and a satellite antenna; a digital processor 124 employing a differencing algorithm, and connected to receive position signals from 120; a digital storage and retrieval facility 126 accessed and updated by processor 124, and an operator display and/or automatic machine controls at 128 receiving signals from processor 124.

GPS receiver system 120 includes a satellite antenna receiving signals from global positioning satellites, and a local reference antenna. The GPS receiver system 120 uses position signals from the satellite antenna and differential correction signals from the local reference antenna to generate position coordinate data in three-dimensions to centimeter accuracy for moving objects. Alternatively, raw data from the reference antenna can be processed by the system to determine the differential correction.

This position information is supplied to digital processor 124 on a real-time basis as the coordinate sampling rate of the GPS receiver 120 permits. The digital storage facility 126 stores a first site model of the desired site geography, for example according to an architect's plan, and a second digitized site model of the actual site geography, for example as initially surveyed. The site model corresponding to the actual site geography can be accessed and updated in real time by digital processor 124 as it receives new position information from GPS receiver 120.

Digital processor 124 further generates signals representing the difference between the continuously-updated actual site model and the architect's plan. These signals are provided to the operator display and/or automatic machine controls at 128 to direct the operation of the machine over the site to bring the updated actual site model into conformity with the architect's plan. The operator display 128, for example, provides one or more visual representations of the difference between the actual, continuously-updated site model and the desired site model to guide the operator in running the machine for the necessary geography-altering operations.

Figure 3:
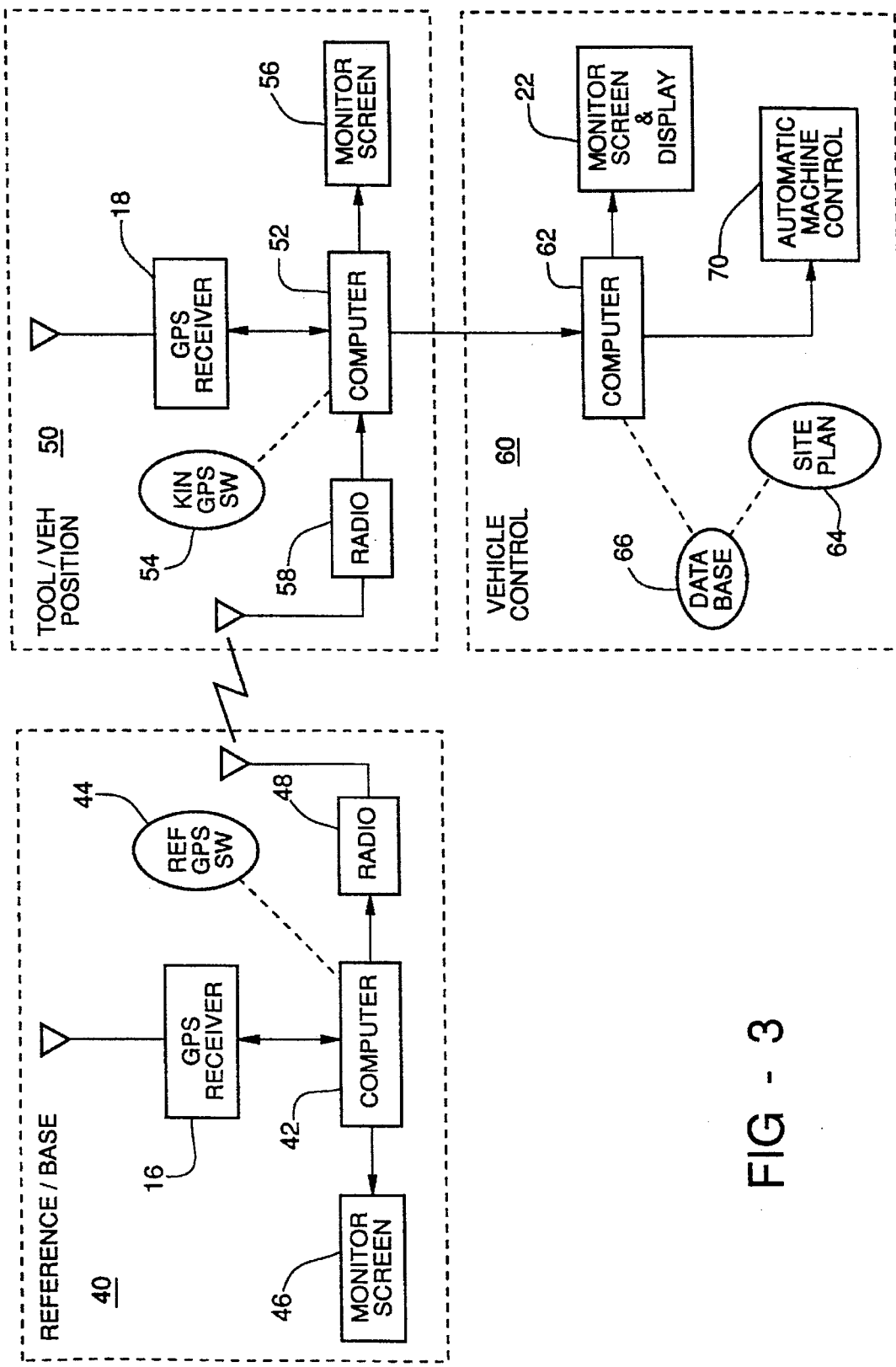
FIG. 3 is a detailed schematic representation of an embodiment of the system of FIG. 2 using GPS positioning.

Referring now to FIG. 3, a more detailed schematic of a system according to FIG. 2 is shown using kinematic GPS for position reference signals. A base reference module 40 and a position module 50 together determine the three-dimensional coordinates of the geography-altering machine relative to the site, while an update/control module 60 converts this position information into real time representations of the site which can be used to accurately monitor and control the machine.

Base reference module 40 includes a stationary GPS receiver 16; a computer 42 receiving input from receiver 16; reference receiver GPS software 44, temporarily or permanently stored in the computer 42; a standard computer monitor screen 46; and a digital transceiver-type radio 48 connected to the computer and capable of transmitting a digital data stream. In the illustrative embodiment base reference receiver 16 is a high accuracy kinematic GPS receiver; computer 42 for example is a 486DX computer with a hard drive, 8 megabyte RAM, two serial communication ports, a printer port, an external monitor port, and an external keyboard port; monitor screen 46 is a passive matrix color LCD; and radio 48 is a commercially available digital data transceiver.

Position module 50 comprises a matching kinematic GPS receiver 18, a matching computer 52 receiving input from receiver 18, kinematic GPS software 54 stored permanently or temporarily in computer 52, a standard computer monitor screen 56, and a matching transceiver-type digital radio 58 which receives signals from radio 48 in base reference module 40. In the illustrative embodiment position module 50 is located on the geography-altering machine to move with it over the work site.

Update/control module 60, also carried on board the machine in the illustrated embodiment, includes an additional computer 62, receiving input from position module 50; one or more digitized site models 64 digitally stored or loaded into the computer memory; a dynamic database update module 66, also stored or loaded into the memory of computer 62; and a color operator display screen 22 connected to the computer. Instead of, or in addition to, operator display 22, automatic machine controls 70 can be connected to the computer to receive signals which operate the machine in an autonomous or semi-autonomous manner in known fashion.

Although update/control module 60 is here shown mounted on the mobile machine, some or all portions may be stationed remotely. For example, computer 62, site model (s) 64, and dynamic database 66 could be connected by radio data link to position module 50 and operator display 22 or machine control interface 70. Position and site update information can then be broadcast to and from the machine for display or use by operators or supervisors both on and off the machine.

Base reference station 40 is fixed at a point of known three-dimensional coordinates relative to the work site. Through receiver 16 base reference station 40 receives position information from a GPS satellite constellation, using the reference GPS software 44 to derive an instantaneous error quantity or correction factor in known manner. This correction factor is broadcast from base station 40 to position station 50 on the mobile machine via radio link 48,58. Alternatively, raw position data can be transmitted from base station 40 to position station 50 via radio link 48,58, and processed by computer 52.

Machine-mounted receiver 18 receives position information from the satellite constellation, while the kinematic GPS software 54 combines the signal from receiver 18 and the correction factor from base reference 40 to determine the position of receiver 18 and the machine relative to base reference 40 and the work site within a few centimeters. This position information is three-dimensional (e.g., latitude, longitude and elevation) and is available on a point-by-point basis according to the sampling rate of the GPS system.

Referring to update/control module 60, once the digitized plans or models of the site have been loaded into computer 62, dynamic database 66 generates signals representative of the difference between actual and desired site geography to display this difference graphically on operator display screen 22. For example, profile and/or plan views of the actual and desired site models are combined on screen 22 and the elevational difference between their surfaces is indicated. Using the position information received from position module 50, the database 66 also generates a graphic icon of the machine superimposed on the actual site model on display 22 corresponding to the actual position and direction of the machine on the site.

Because the sampling rate of the position module 50 results in a time/distance delay between position coordinate points as the machine moves over the site, the dynamic database 66 of the present invention uses a differencing algorithm to determine and update in real-time the path of the machine.

With the knowledge of the machine's exact position relative to the site, a digitized view of the site, and the machine's progress relative thereto, the operator can maneuver the machine over the site to perform various geography-altering operations without having to rely on physical markers placed over the surface of the site. And, as the operator moves the machine over the site the dynamic database 66 continues to read and manipulate incoming position information from module 50 to dynamically update both the machine's position relative to the site, the path of the machine over the site, and any change in actual site geography effected by the machine's passage. This updated information is used to generate representations of the site and can be used to direct the operation of the machine in real time to bring the actual, updated site geography into conformity with the desired site model.

Industrial Applicability

Figure 4:
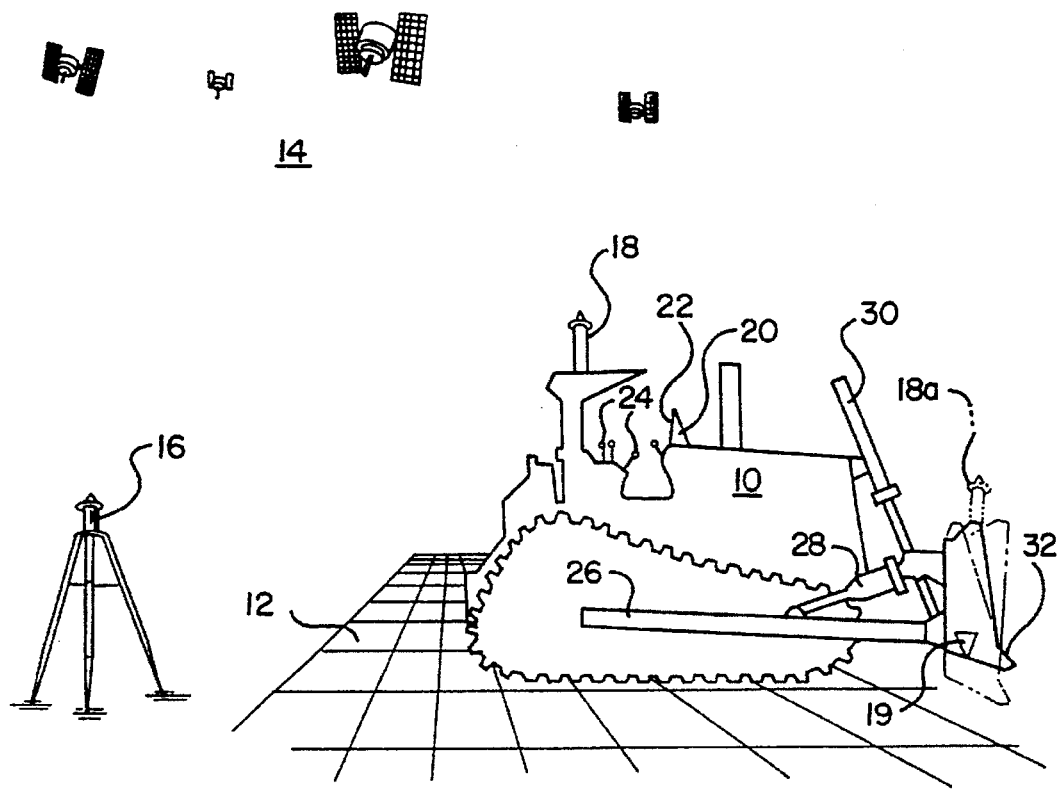
FIG. 4 is a schematic representation of a work site, geography altering machine, and position and control system according to an illustrative earth contouring embodiment of the present invention.

Referring to FIG. 4, a geography altering machine 10 is shown on location at a construction site 12. In the illustrative embodiment of FIG. 4 machine 10 is a track-type tractor which performs earthmoving and contouring operations on the site. It will become apparent, however, that the principles and applications of the present invention will lend themselves to virtually any mobile tool or machine with the capacity to move over or through a work site and alter the geography of the site in some fashion.

Machine 10 is equipped in known fashion with available hydraulic or electrohydraulic tool controls as schematically shown at 24. In the tractor contouring embodiment of FIG. 4 these controls operate, among other things, push arm 26, tip/pitch cylinders 28, and lift cylinders 30 to maneuver blade 32 in three dimensions for desired cut, fill and carry operations.

Machine 10 is equipped with a positioning system capable of determining the position of the machine and/or its site-altering tool 32 with a high degree of accuracy, in the embodiment of FIG. 4 a phase differential GPS receiver 18 located on the machine at fixed, known coordinates relative to the site-contacting portions of the tracks. Machine-mounted receiver 18 receives position signals from a GPS constellation 14 and an error/correction signal from base reference 16 via radio link 48,58 as described in FIG. 3. Machine-mounted receiver 18 uses both the satellite signals and the error/correction signal from base reference 16 to accurately determine its position in three-dimensional space. Alternatively, raw position data can be transmitted from base reference 16, and processed in known fashion by the machine-mounted receiver system to achieve the same result. Information on kinematic GPS and a system suitable for use with the present invention can be found, for example, in U.S. Pat. No. 4,812,991 dated Mar. 14, 1989 and U.S. Pat. No. 4,963,889 dated Oct. 16, 1990, both to Hatch. Using kinematic GPS or other suitable three-dimensional position signals from an external reference, the location of receiver 18 and machine 10 can be accurately determined on a point-by-point basis within a few centimeters as machine 10 moves over site 12. The present sampling rate for coordinate points using the illustrative positioning system is approximately one point per second.

The coordinates of base receiver 16 can be determined in any known fashion, such as GPS positioning or conventional surveying. Steps are also being taken in this and other countries to place GPS references at fixed, nationally surveyed sites such as airports. If site 12 is within range (currently approximately 20 miles) of such a nationally surveyed site and local GPS receiver, that local receiver can be used as a base reference. Optionally, a portable receiver such as 16, having a tripod-mounted GPS receiver, and a rebroadcast transmitter can be used. The portable receiver 16 is surveyed in place at or near site 12 as previously discussed.

Also shown in schematic form on the tractor of FIG. 4 is an on-board digital computer 20 including a dynamic database and a color graphic operator display 22. Computer 20 is connected to receiver 18 to continuously receive machine position information. Although it is not necessary to place computer 20, the dynamic database and the operator display on tractor 10, this is currently a preferred embodiment and simplifies illustration.

Figure 5B:
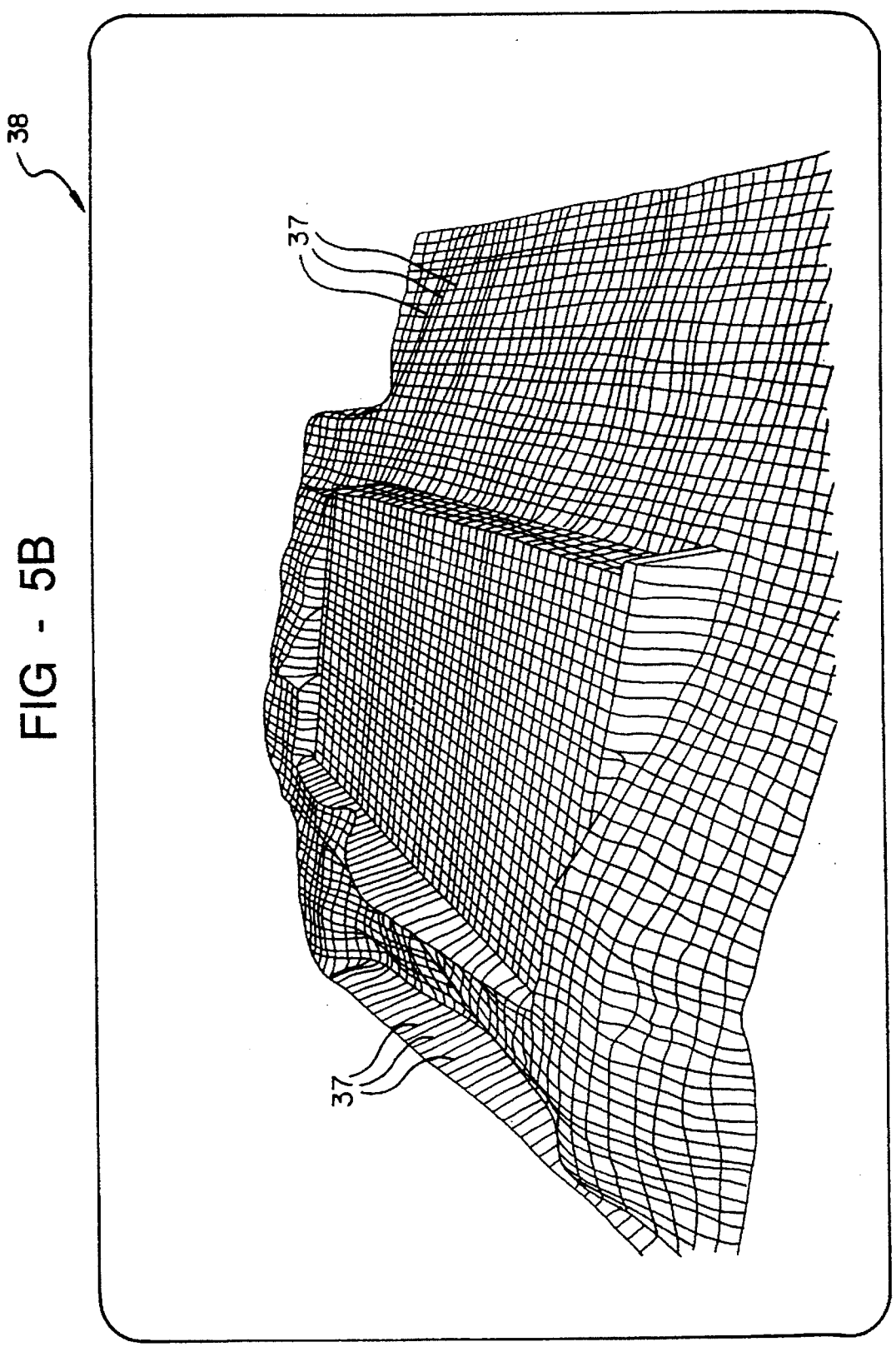

Referring to FIGS. 5A–5B, site 12 has previously been surveyed to provide a detailed topographic blueprint (not shown) showing the architect's finished site plan overlaid on the original site topography in plan view. The creation of geographic or topographic blueprints of sites such as landfills, mines, and construction sites with optical surveying and other techniques is a well-known art; reference points are plotted on a grid over the site, and then connected or filled in to produce the site contours on the blueprint. The greater the number of reference points taken, the greater the detail of the map.

Systems and software are currently available to produce digitized, two- or three-dimensional maps of a geographic site. For example, the architect's blueprint can be converted into three-dimensional digitized models of the original site geography or topography as shown at 36 in FIG. 5A and of the desired site model as shown at 38 in FIG. 5B. The site contours can be overlaid with a reference grid of uniform grid elements 37 in known fashion. The digitized site plans can be superimposed, viewed in two or three dimensions from various angles (e.g., profile and plan), and color coded to designate areas in which the site needs to be machined, for example by removing earth, adding earth, or simply left alone. Available software can also estimate the quantity of earth required to be machined or moved, make cost estimates and identify various site features and obstacles above or below ground.

However site 12 is surveyed, and whether the machine operators and their supervisors are working from a paper blueprint or a digitized site plan, the prior practice is to physically stake out the various contours or reference points of the site with marked instructions for the machine operators. Using the stakes and markings for reference, the operators must estimate by sight and feel where and how much to cut, fill in, carry or otherwise contour or alter the original geography or topography to achieve the finished site plan. Periodically during this process the operator's progress is manually checked to coordinate the contouring operations in static, step-by-step fashion until the final contour is achieved. This manual periodic updating and checking is labor-intensive, time consuming, and inherently provides less than ideal results.

Moreover, when it is desired to revise the blueprint or digitized site model as an indicator of progress to date and work to go, the site must again be statically surveyed and the blueprint or digitized site model manually corrected off-site in a non-real time manner.

To eliminate the drawbacks of prior art static surveying and updating methods, the present invention integrates accurate three-dimensional positioning and digitized site mapping with a dynamically updated database and operator display for real-time monitoring and control of the site 12 and machine 10. The dynamic site database determines the difference between the actual and desired site model geographies, receives kinematic GPS position information for machine 10 relative to site 12 from position receiver 18, displays both the site model and the current machine position to the operator on display 22, and updates the actual site model geography, machine position and display in real time with a degree of accuracy measured in centimeters. The operator accordingly achieves unprecedented knowledge of and control over the earthmoving operations in real time, on-site, and can accordingly finish the job with virtually no interruption or need to check or re-survey the site.

Referring now to FIGS. 6A–6D, a number of illustrative displays available to the machine operator on screen 22 are shown for the topographical contouring application of FIG. 4. While the illustrated embodiment of FIGS. 6A–6D shows operator displays for earth contouring operations with a tractor-mounted blade, it will be apparent to those skilled in the art that relevant displays for virtually any type of earthmoving or geography altering operation and machine can be provided with the present invention.

Referring to FIGS. 6A and 6B a first embodiment of an operator display on screen 22 has as a principal component a three-dimensional digitized site model in plan window 70 showing the desired final contour or plan of site 12 (or a portion thereof) relative to the actual topography. On an actual screen display 70 the difference between the actual site topography and the desired site model are more readily apparent, since color coding or similar visual markers are used to show areas in which earth must be removed, areas in which earth must be added, and areas which have already achieved conformity with the finished site model.

In FIG. 6B, operator display 22 is the same as that in FIG. 6A, except that the site plan window 70 shows a two-dimensional plan view and the machine is in a different position relative to the site. The differently shaded or cross-hatched regions on the site displayed in window 70 graphically represent the varying differences between the actual site topography and desired site topography.

Operator display screen 22 includes a horizontal coordinate window or display 72 at the top of the screen, showing the operator's position in three dimensions relative to base reference 16. Coarse and fine resolution sidebar scales 74,75 show the elevational or z-axis deviation from the target contour elevation, providing an indicator of how much the tractor blade 32 should cut or fill at that location. The coarse indicator 74 on the right shows scaled elevation of 1.0 foot increments above and below the target elevation; the fine resolution side bar 75 of the left side of the display lists 0.1 foot increments and provides a convenient reference when the operator is within a foot or less of the target contour. Using "zoom" or "autoscaling" features in the display software, the scales 74,75 can be changed to smaller increments as the operator nears the target topography.

The display increments and units of measurement used in the system and method of the present invention can be metric (meters, centimeters, etc.) or non-metric, as desired by the user.

A further reference is provided to the machine operator in profile window 76 at the bottom of screen 22. Profile window 76 shows the elevational difference between the actual site topography 76a and the desired topography 76b in the path of the machine and immediately behind the machine. An elevation scale 78 on the left side of profile display 76 can provide an additional indicator of how deep to make a cut or how much earth to add at a given location, while the horizontal scale 79 at the bottom of profile display 76 indicates the distance ahead of the tractor/blade at which the operator will encounter certain actual and desired topography differences. In this manner the operator can simultaneously monitor the upcoming terrain and the accuracy of the most recent pass in achieving the target contour, and adjust operations accordingly.

The position of the tractor on site 12 is displayed graphically on screen 22 as a tractor blade icon 82 superimposed on the plan window 70, the profile window 76, and the appropriate sidebar scale 74,75. In the site plan window 70 icon 82 is provided with a forward-projecting direction indicator 84, which serves to identify the terrain a fixed distance ahead of the tractor in its direction of travel. The anticipated terrain shown in front of tractor icon 82 in profile window 76 corresponds to that portion of site 12 covered by direction indicator 84. In FIGS. 6A and 6B while icon 82 in windows 70,74,75 moves in response to the current position of the machine relative to the site, the icon 82 in profile window 76 remains centered while the site topography profiles 76a, 76b scroll past it according to machine movement.

With the detailed position, direction and target contour information provided to the operator via display 22, centimeter-accurate control can be maintained over the earth moving operations. Also, the operator has a complete, up-to-date, real-time display of the entire site, progress to date, and success in achieving the desired topography. At the end of the day the digitized site model in the database has been completely updated, and can simply be stored for retrieval the following day to begin where the operator stopped, or off-loaded for further analysis.

Figure 6C:
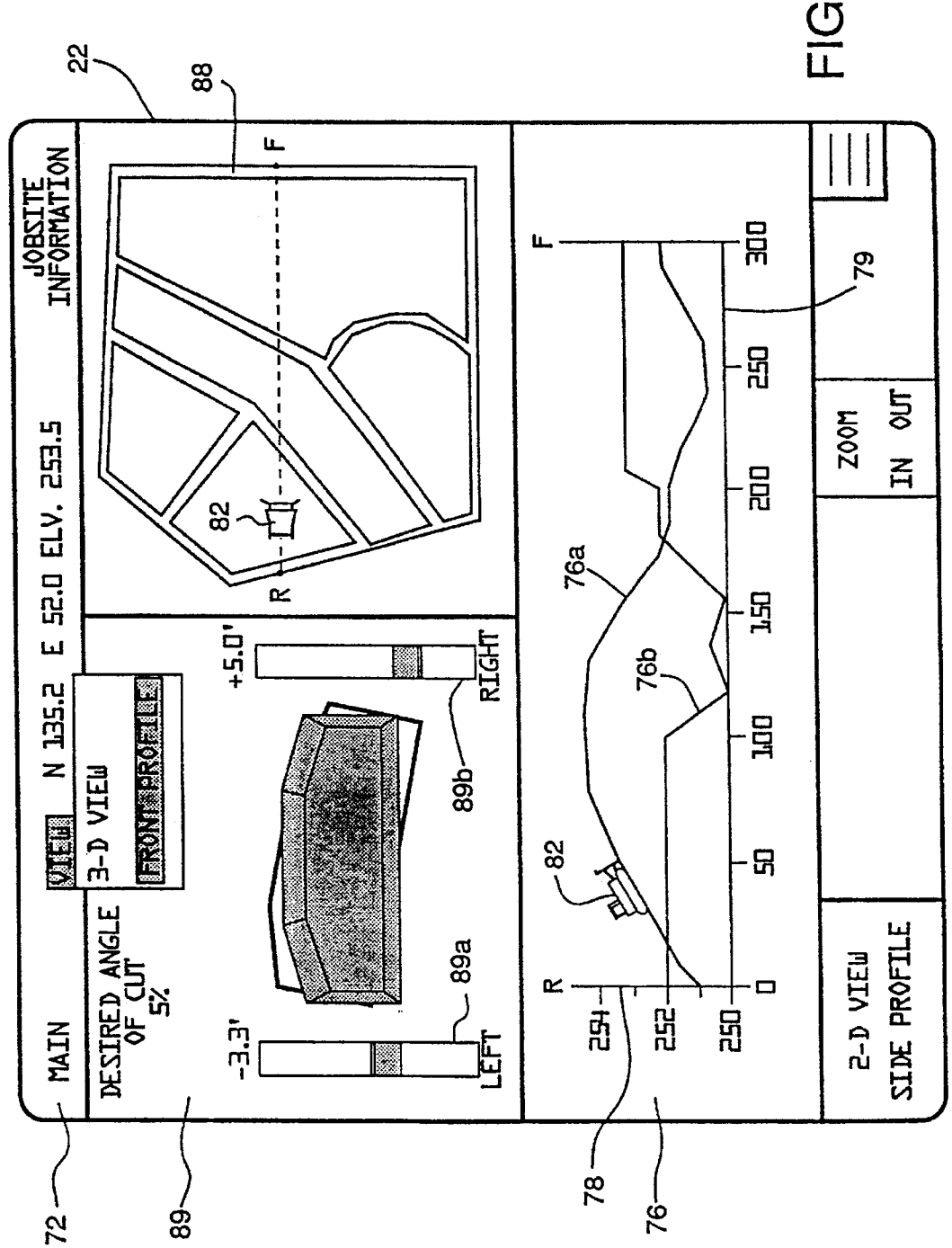
Figure 6D:
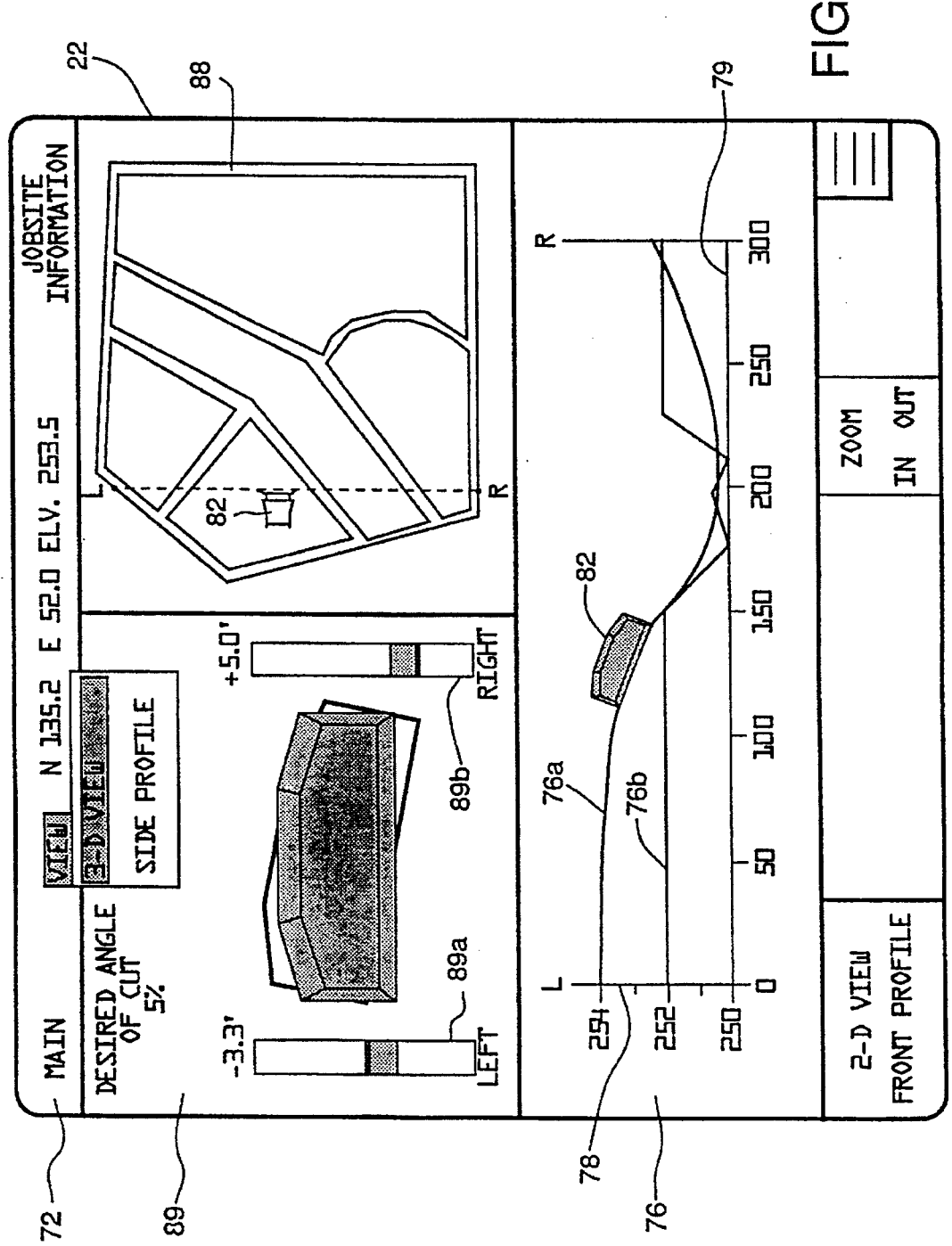

Referring to FIGS. 6C and 6D, a slightly different operator display is provided, having a schematic plan window 88 of the site contours, a blade front profile window 89 with left and right blade edge elevation side bars 89a,89b to help align the blade rotationally for an angled cut or a cut on angled terrain, and a profile window 76 on a larger scale and using a different tractor/blade icon 82. The display of FIG. 6D is the same as that in FIG. 6C, except that side profile view 76 has been rotated 90° for a different perspective on the tractor operation. FIGS. 6C and 6D are shown primarily to illustrate the flexibility and applicability of the principles of the present invention for various geography altering applications.

In the illustrated embodiment of a tractor contouring application, the machine-mounted position receiver 18 is positioned on the cab of tractor 10 at a fixed, known distance from the bottom of the ground-engaging portion of the tractor tracks. Since the tracks are actually in contact with the site topography, receiver 18 is calibrated to take this elevational difference into account; in effect, the cab-mounted receiver 18 is perceived by the system as being level with the site topography over which the machine is operating.

While the use of a single position receiver 18 at a fixed distance from the machine's site-contacting carriage or tread is an effective and sturdy mounting arrangement, in certain applications it may be preferable to use different mounting arrangements for the positioning receiver. For example, the current direction of the tractor relative to the site plan, as shown on display 22 by icon 82 and direction indicator 84 in FIG. 6A, may be off by a slight time lag vector, depending on the sampling rate of the receiver 18 and the machine's rate of directional change. With only one position receiver 18 mounted on tractor 10, machine direction at a single point cannot be determined since the machine effectively pivots around the single receiver. This problem is solved by placing a second position receiver on the machine, spaced from the first, for a directional reference point.

Additionally, the distance between the blade 32 and the rearwardly-mounted GPS receiver 18 in FIG. 4 creates a slight real time delay in resolving the position of the blade as it performs the earth moving operations. In most cases this delay is negligible, since the GPS position follows close behind blade 32 and matches the just-made alterations to the site geography. On larger machines, however, it may be preferable to mount one or more position receivers 18a directly on the cutting blade as shown in FIG. 4 in phantom. In this arrangement, because the blade moves up and down relative to the machine and the surface of the site, it is also desirable to provide an apparatus for measuring the distance between the bottom of the blade and the surface of the site. A suitable device, for example, is a sonic proximity detector mounted on the blade as schematically shown at 19 in FIG. 4, connected to provide signals representing the height of blade 32 above the surface to computer 20 and the dynamic database. These and other suitable proximity detectors are commercially available. The dynamic database uses the signals from proximity detector 19 to compensate for variations in the relative position of a blade-mounted GPS receiver to the ground, and can also correct for blade wear, and blade lift caused when the tractor backs up.

Figure 4A:
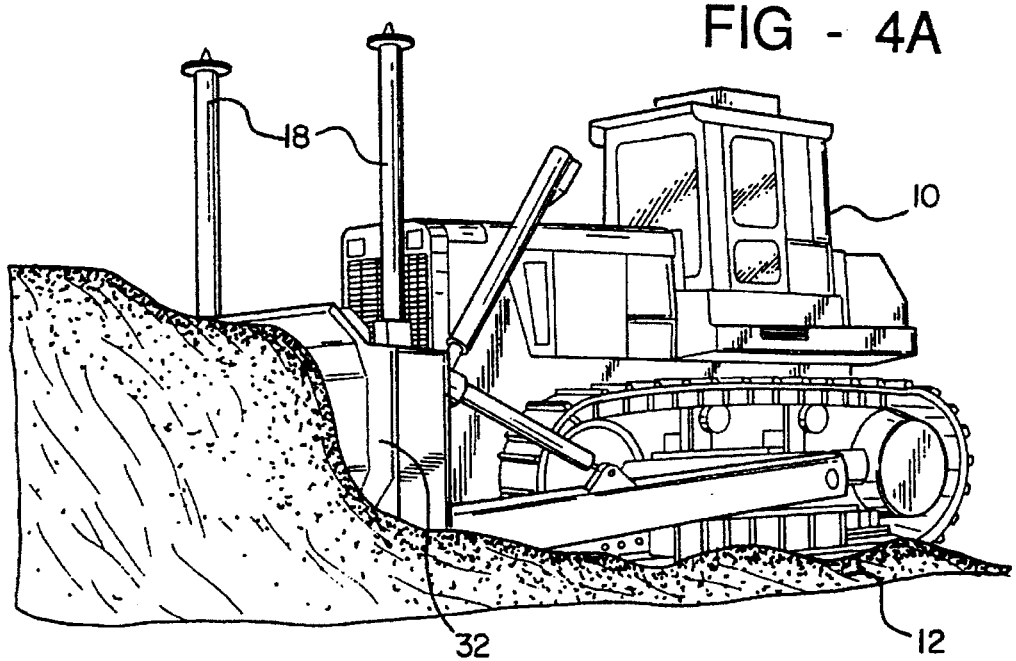
FIG. 4A shows an alternate arrangement of the machine-mounted positioning system of FIG. 4.

Another consideration when mounting the position receiver equipment on machine 10 is whether the machine carries a tool which moves independently to perform the geography altering operations; tractor 10 with its controllably movable blade 32 is a good example. To improve the accuracy of monitoring and control over the geography altering operations of tool 32, the preferable mounting arrangement for the position receiver 18 in many cases may be directly on tool 32. In a machine contouring application the illustrative blade-mounted dual receiver arrangement of FIG. 4A not only places receivers 18 directly over the point where alterations to the site are made, but the two receivers 18 provide directional reference for the machine when it changes direction, and position information for a left/right blade angle measurement such as shown at 89 in FIGS. 6C and 6D.

Figure 7A:
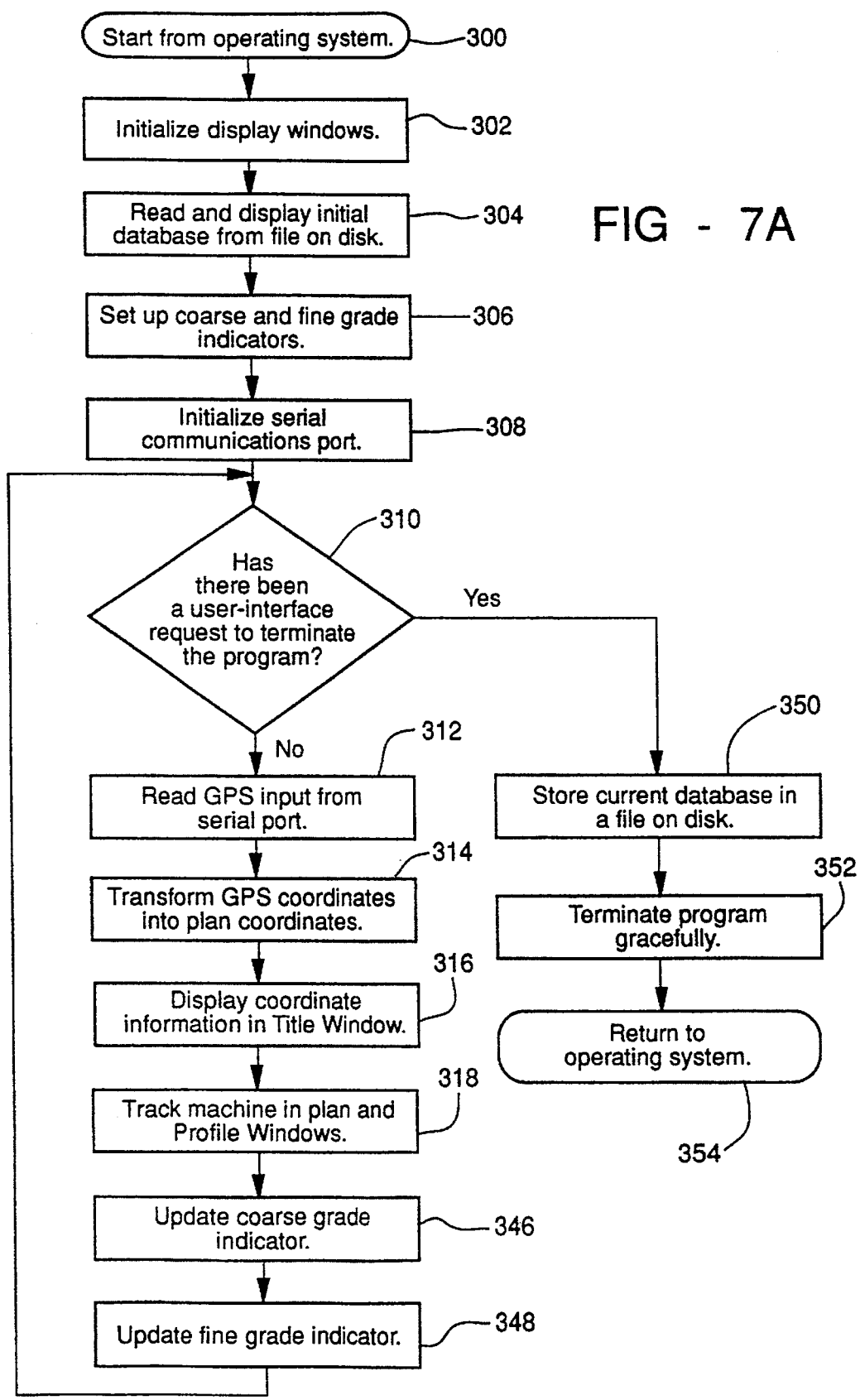
FIGS. 7A-7D are flowchart representations of a dynamic site database according to the present invention.

Referring to FIG. 7A, the operational steps of the dynamic database 66 for the machine contouring operation are shown schematically. The system is started at 300 from the computer's operating system. The graphics for the display screens are initialized at 302. The initial site database (a digitized site plan) is read from a file in the program directory, and the site plan and actual and target topography are drawn on the display at step 304. The side bar grade indicators from display 22 are set up at step 306, and the various serial communication routines among modules 40,50,60 (FIG. 3) are initialized at step 308. At step 310 the system checks for a user request to stop the system, for example at the end of the day, or for meal breaks or shift changes. The user request to terminate at step 310 can be entered with any known user-interface device, for example a computer keyboard or similar computer input device, communicating with computer 62.

The machine's three-dimensional position is next read at step 312 from the serial port connection between position module 50 and control/update module 60 in FIG. 3. At step 314 the machine's GPS position is converted to the coordinate system of the digitized site plans, and these coordinates are displayed in window 72 on screen 22 at step 316.

At step 318 the machine path is determined in both plan and profile views, and updated in real time to indicate the portions of the site plan grid over which the machine has operated. In the machine contouring embodiment, the width of the machine path is equated to its geography-altering tool (tractor blade 32) as it passes over the site. An accurate determination of the grid squares over which blade 32 passes is necessary to provide real time updates of the operator's position and work on the dynamic site plan. The size of the grid elements on the digitized site plan is fixed, and although the width of several grid elements can be matched evenly to the width of the machine (i.e., the tractor blade), the blade will not always completely cover a particular grid element as the machine passes by. Even if the machine/tool width is an exact multiple of grid element width, it is rare that the machine would travel in a direction aligned with the grid elements so as to completely cover every element in its path.

Figure 7B:
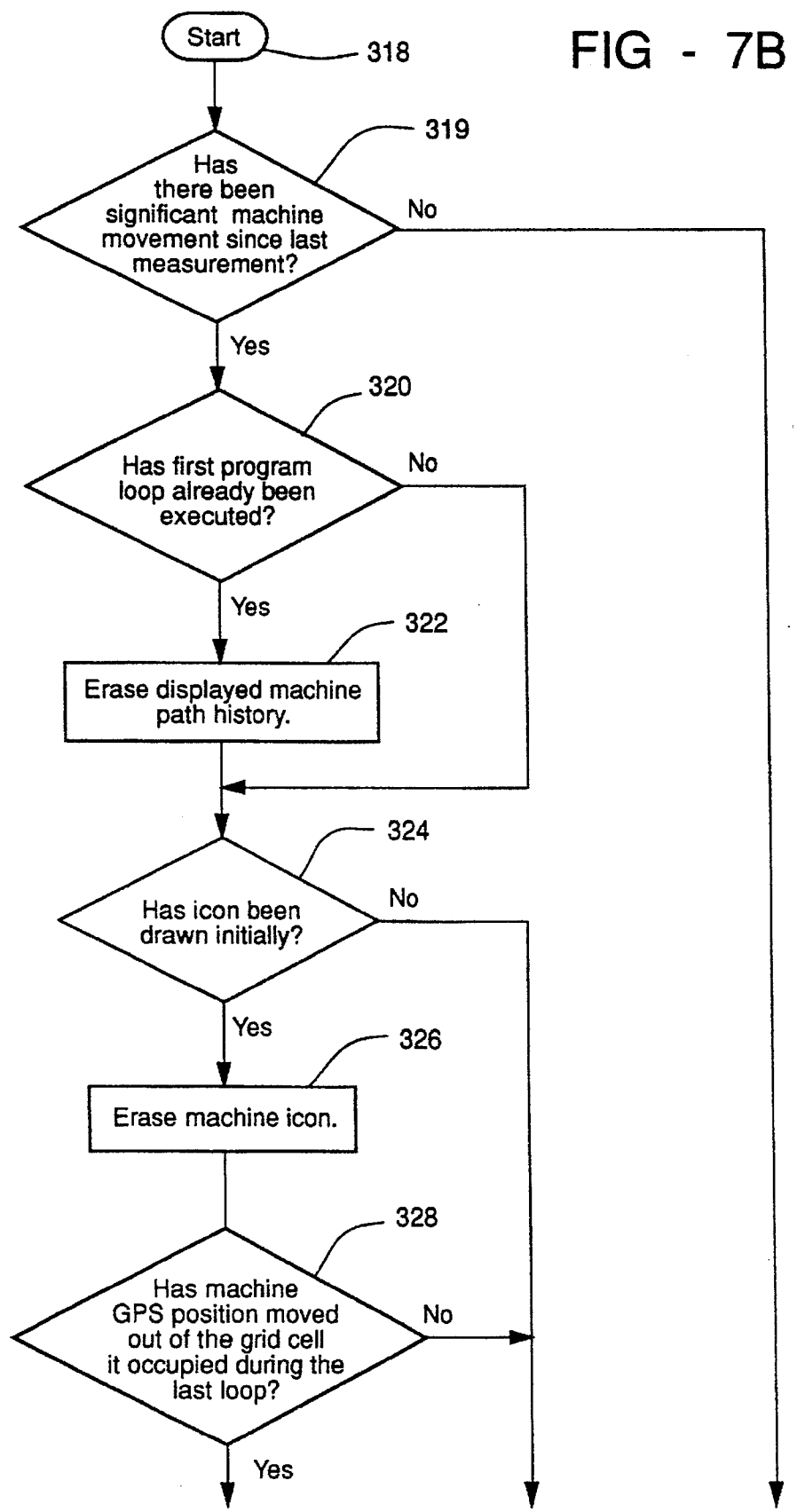
Figure 7C:
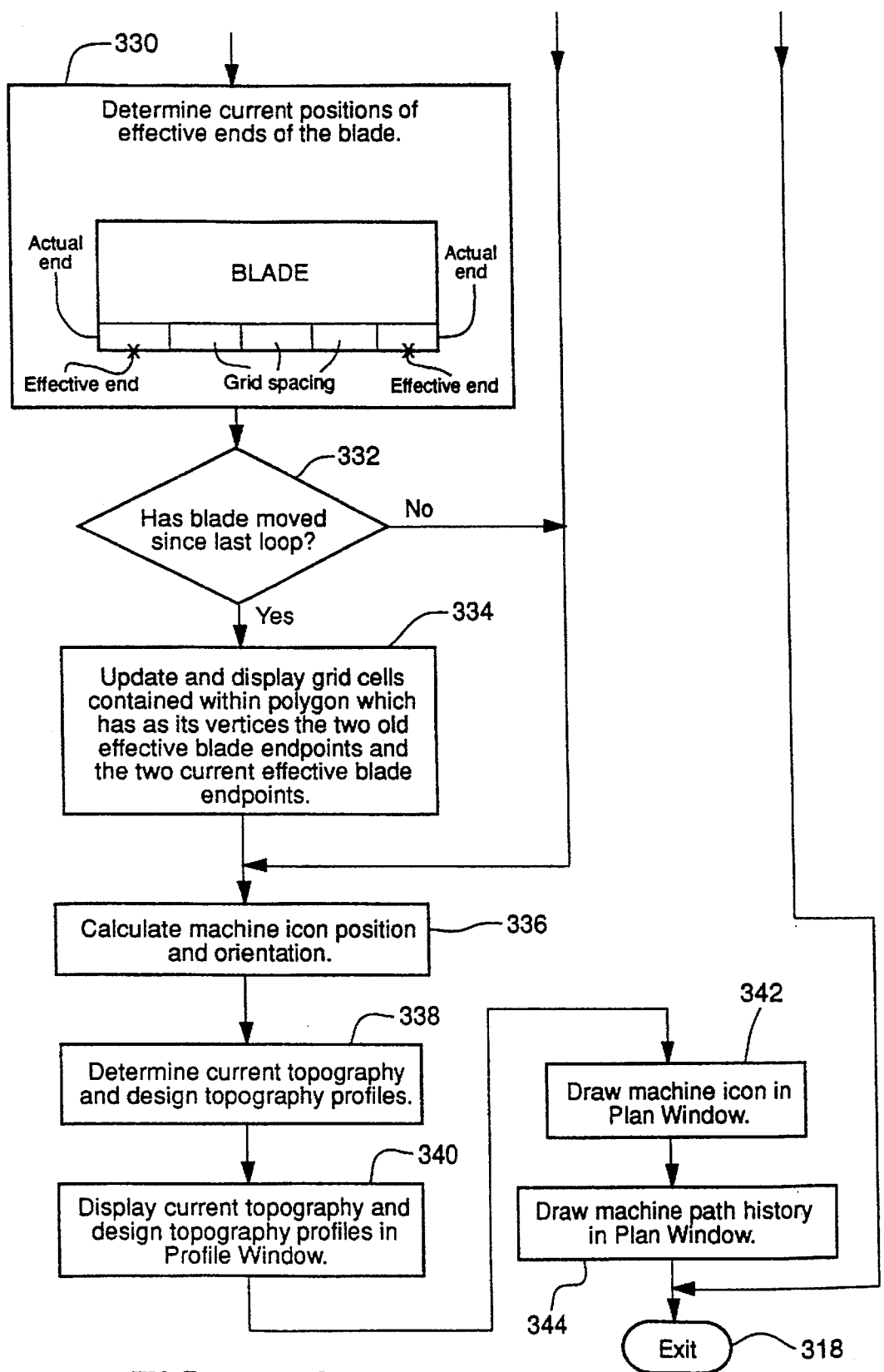

To remedy this problem, in FIGS. 7B–7C a subroutine for step 318 determines the path of the operative portion of the machine (here the tractor blade 32) relative to the site plan grid. At step 319 in FIG. 7B the module determines whether the machine-mounted receiver position has changed latitudinally or longitudinally (in the x or y directions in an [x, y, z] coordinate system) relative to the site. If yes, the system at step 320 determines whether this is the first system loop. If the present loop is not the first loop, the machine path determined and displayed from the previous loops is erased at step 322 for updating in the present loop. If the present loop is the first loop, step 322 is simply bypassed, as there is no machine path history to erase.

At step 324 the tractor icon is initially drawn. If already drawn, the tractor icon is erased from its previous position on the site model plan at step 326. At step 328 the system determines whether the machine's current position coordinates are outside the grid element the machine occupied in the last system loop.

If at step 328 the position of the machine has not changed, for example if the dozer is parked or idling, the system proceeds to steps 336–344.

If at step 328 the position of the machine relative to the site plan grid has changed, the system proceeds to step 330 where it designates "effective" tractor blade ends inboard from the actual blade ends. In the illustrated embodiment the effective blade ends are recognized by the differencing algorithm as inboard from the actual ends a distance approximately one half the width of a grid element. For example, if the actual dozer blade 32 is 10.0 feet long, corresponding to five 2.0 ft.×2.0 ft grid elements, the effective locations of the blade ends are calculated at step 330 one foot inboard from each actual end. If the effective (non-actual) blade ends contact or pass over any portion of a grid element on the digitized site model, that grid element is read and manipulated by the differencing algorithm as having been altered by the machine, since in actuality at least one half of that grid element was actually passed over by the blade. Of course, the amount of blade end offset can vary depending on the size of the grid elements and the desired margin of error in determining whether the blade has passed over a grid element. For example, it is possible to set the effective tool parameters equal to the actual tool parameters, although the smaller effective parameters of the illustrated embodiment are preferred.

It will be understood that this blade-locating method is applicable to any geography altering operation in which it is desired to determine the path of a continuous portion of the machine or its tool traversing the grid elements of the site model.

At step 332 the system determines whether the blade has moved since the last system loop. If the blade has moved, the system proceeds to step 334 to determine the real-time path of the blade over the site plan grid in a manner described in further detail below with reference to FIG. 7D. If at step 332 the blade has not moved since the last system loop, the system bypasses step 334. At step 336 the system uses the above-determined machine path information to calculate the machine icon position and orientation. At step 338 this information is used to determine the current or actual site geography and the desired site geography profiles. At step 340 these profiles are displayed on operator display 22 in profile window 76. At step 342 the system next draws the machine icon on the plan window 70, and at step 344 the machine path history previously erased is redrawn to reflect the most recent machine movement and site alterations in the path of the machine.

Referring back to step 319 of the subroutine for step 318, if there has been no significant change in the machine's position since the last measurement, the machine position, tracking and updating steps 320–344 are bypassed, and the system proceeds from the subroutine of step 318 in FIG. 7A to step 346.

At steps 346, 348 in FIG. 7A, the coarse and fine grade indicators on the display are updated, and the system completes its loop and returns to step 310.

At step 310 the option is available to the operator to stop the system as described above, for example at the end of the day or at lunchtime. If the operator chooses at step 310 to stop the system, the system proceeds to step 350 where the current database is stored in a file on a suitable digital storage medium in the system computer, for example, a permanent or removable disk. At step 352 the operations of the differencing module are terminated, and at step 354 the operator is returned to the computer operating system. If the operator does not quit the system, it returns to step 312 where subsequent position readings are taken from the serial port connected to position module 50 and receiver 18, and the system loop repeats itself.

Figure 7D:
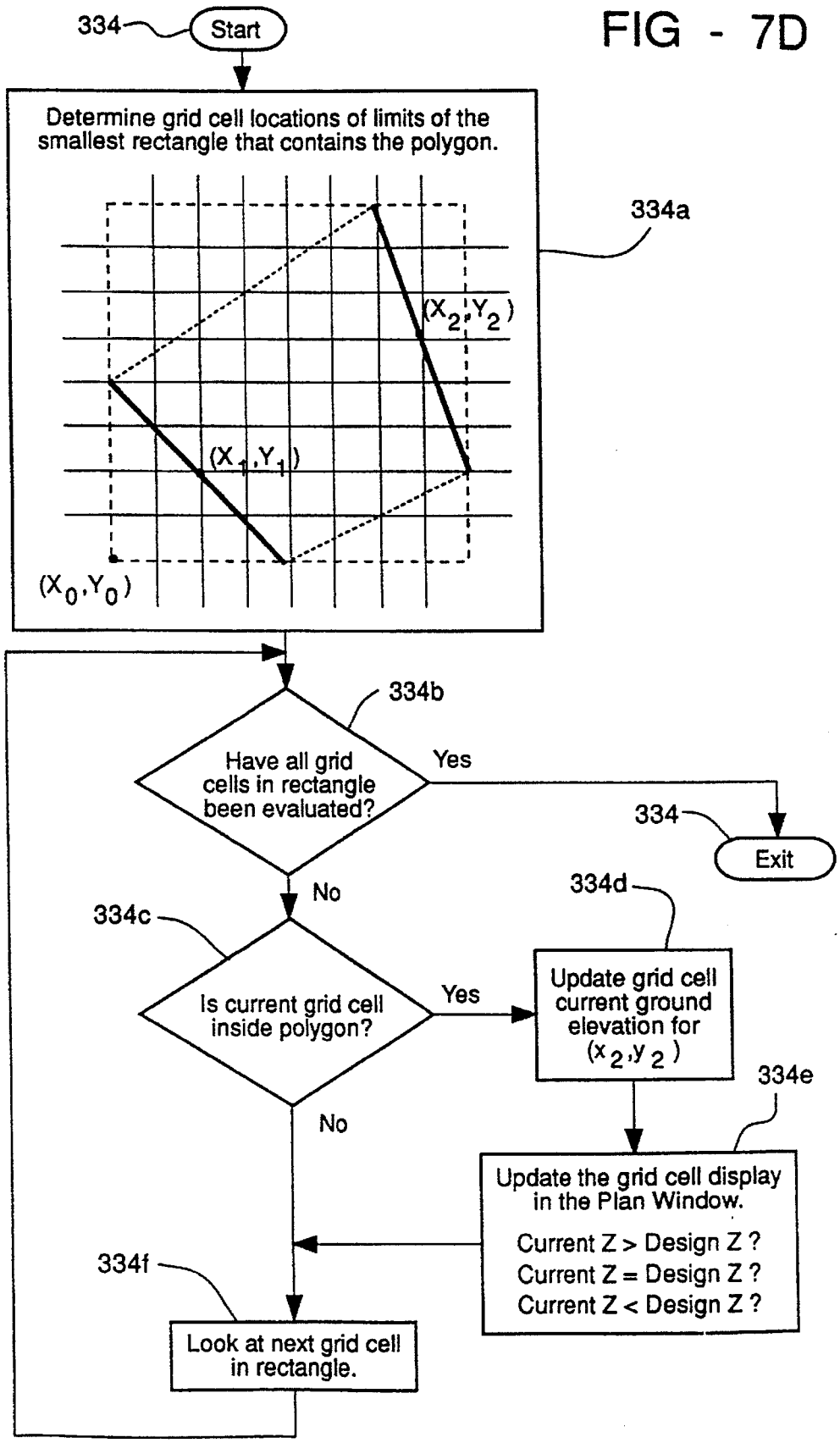

The subroutine for step 334 in FIG. 7C which updates the machine path and current site plan is shown in further detail in FIG. 7D. While the algorithm of step 330 compensates for the lack of complete correspondence between the width of the machine or tool and the number of grid elements completely traversed by the machine or tool, the distance and direction changes which the machine/tool makes between GPS position readings results in a loss of real time update information over a portion of the machine's travel. This is particularly acute where machine travel speed is high relative to the grid elements of the site plan. For example, where the grid elements are one meter square and the sampling rate of the position system is one coordinate sample per second, a machine traveling at 18 kilometers per hour travels approximately five meters or five grid squares between position samplings. Accordingly, there is no real time information with respect to at least the intermediate three of the five grid squares covered by the machine.

To solve this problem a "fill in the polygon" algorithm is used in step 334 to estimate the path traversed by the machine between coordinate samplings. In FIG. 7D the algorithm at step 334a locates a rectangle on the site plan grid surface defined by the effective ends of the dozer blade at positions $(x_1, y_1)$ and $(x_2, y_2)$ and coordinate position $(x_0, y_0)$. At steps 334b, 334c and 334f a search algorithm searches within the rectangle's borders for those grid elements within a polygon defined between the two blade positions; i.e., those grid elements traversed by the blade between its effective ends.

At steps 334d and 334e these recently-traversed grid elements are "painted", shaded, marked or otherwise updated to inform the operator whether he is above, below or on the target elevation for those grid elements. In step 334d the ground elevation or z-axis coordinate of the grid elements is updated at coordinate $(x_2, y_2)$. In step 334e a current elevation greater than the target elevation results in the grid elements being, for example, colored red. A current elevation equal to the target elevation results in the grid elements being, for example, colored yellow. A current elevation less than the target elevation results in the grid elements being, for example, colored blue. On the operator display 22 the update appears as the just-traversed swath of grid elements behind the machine/tool icon 82, colored or otherwise visually updated to indicate whether the cut or contour is at, above or below the target contour; an example is shown by the differently-shaded regions of plan window 70 in FIG. 6B. If the target contour has not been matched in that region, the operator can backtrack or correct it on the next pass. The painted swath traversed by the dozer icon will remain on the operator display screen 22 until it is altered sufficiently in subsequent passes to warrant a color change or similar visual update, e.g., until the elevation coordinates of the machine on the actual site come into closer conformity with the elevation coordinates for the desired site model on those grid elements.

While the system and method of the illustrated embodiment of FIGS. 7A–7D are directed to providing real time machine position and site update information via a visual operator display, it will be understood by those skilled in the art that the signals generated which represent the machine position and site update information can be used in a non-visual manner to operate known automatic machine controls, for example electrohydraulic machine and/or tool control system.

Figure 8:
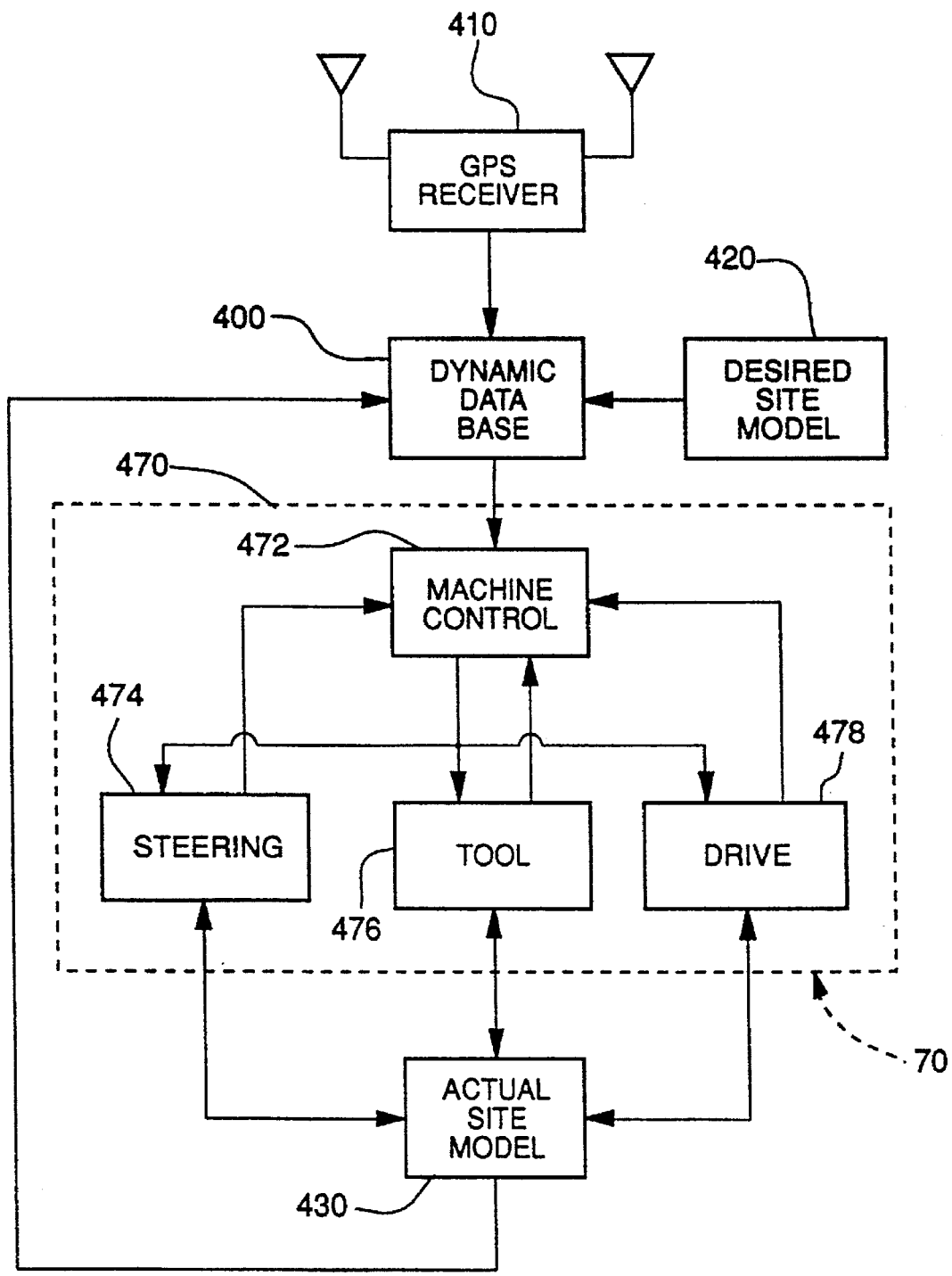
FIG. 8 is a schematic representation of the system of the present invention including a closed-loop automatic machine control system.

Referring now to FIG. 8, a system according to the present invention is schematically shown for closed-loop automatic control of one or more machine or tool operating systems. While the embodiment of FIG. 8 is capable of use with or without a supplemental operator display as described above, for purposes of this illustration only automatic machine controls are shown. A suitable digital processing facility, for example a computer as described in the foregoing embodiments, containing the algorithms of the dynamic database of the invention is shown at 400. The dynamic database 400 receives 3-D instantaneous position information from GPS receiver system 410. The desired digitized site model 420 is loaded or stored in the database of computer 400 in any suitable manner, for example on a suitable disk memory. Automatic machine control module 470 contains electrohydraulic machine controls 472 connected to operate, for example, steering, tool and drive systems 474,476,478 on the geography-altering machine. Automatic machine controls 472 are capable of receiving signals from the dynamic database in computer 400 representing the difference between the actual site model 430 and the desired site model 420 to operate the steering, tool and drive systems of the machine to bring the actual site model into conformity with the desired site model. As the automatic machine controls 472 operate the various steering, tool and drive systems of the machine, the alterations made to the site and the current position and direction of the machine are received, read and manipulated by the dynamic database at 400 to update the actual site model. The actual site update information is received by database 400, which correspondingly updates the signals delivered to machine controls 472 for operation of the steering, tool and drive systems of the machine as it progresses over the site to bring the actual site model into conformity with the desired site model.

It will be apparent to those skilled in the art that the inventive method and system can be easily applied to almost any geography altering, machining or surveying operation in which a machine travels over or through a work site to monitor or effect some change to the site geography in real-time. The illustrated embodiments provide an understanding of the broad principles of the invention, and disclose in detail a preferred application, and are not intended to be limiting. Many other modifications or applications of the invention can be made and still lie within the scope of the appended claims.

We claim:

1. Apparatus for directing the operations of a mobile geography-altering machine comprising:

(a) digital data storage and retrieval means for storing a first three-dimensional geographic site model representing the desired geography of a site and a second three-dimensional geographic site model representing the actual geography of the site;

(b) means for generating digital signals representing in real time the instantaneous position in three-dimensional space of at least a portion of the machine as it traverses the site;

(c) means for receiving said signals and for updating the second model in accordance therewith;

(d) means for determining and updating the difference between the first and second models in real time; and (e) means for directing the operation of said machine in accordance with the difference to bring the updated second model into conformity with the first model.

2. Apparatus as defined in claim 1, wherein the means for generating three-dimensional position signals include a GPS receiver.

3. Apparatus as defined in claim 1, wherein the means for generating three-dimensional position signals is carried on the machine.

4. Apparatus as defined in claim 3, wherein the machine includes a tool movable relative to the machine for altering the site geography, and the means for generating three-dimensional position signals is mounted on the tool.

5. Apparatus as defined in claim 4, further including means on the machine to determine the elevation of the tool relative to the surface of the site.

6. Apparatus as defined in claim 1, wherein the means for directing the operation of the machine include an operator display.

7. Apparatus as defined in claim 6, wherein the operator display includes a plan view and a profile view of the first and second site models and the difference therebetween.

8. Apparatus as defined in claim 6, wherein the operator display includes a plan view of the site models and the difference therebetween.

9. Apparatus as defined in claim 6, wherein the operator display includes a profile view of the site models and the difference therebetween.

10. Apparatus as defined in claim 7, wherein the operator display includes a real-time display of the position of the mobile machine relative to the site models.

11. Apparatus as defined in claim 8, wherein the operator display includes real-time coarse and fine indicators of the difference between the site models at the position of the mobile machine.

12. Apparatus as defined in claim 6, wherein the operator display is carried on the mobile machine.

13. Apparatus as defined in claim 6, wherein the operator display is located off the mobile machine.

14. Apparatus as defined in claim 1, wherein the means for receiving the position signals and updating the second model, and the means for determining the difference between the first and second models are located on the machine.

15. Apparatus as defined in claim 1, wherein the means for receiving the position signals and updating the second model, and the means for determining the difference between the first and second models are located off the machine.

16. Apparatus as defined in claim 1, wherein the means for directing the operation of the machine include closed-loop automatic control means connected to actuate one or more operating systems on the machine.

17. Apparatus as defined in claim 1, wherein the machine comprises a site contouring machine, the first site model comprises a static three-dimensional model of the desired site geography, and the difference between the first and second models comprises the elevation difference between the actual site geography and the desired site geography.

18. Apparatus as defined in claim 1, further including differencing means for determining in real time the path of the machine relative to the site between position readings.

19. Apparatus as defined in claim 18, wherein the differencing means includes means for determining an effective width of a geography-altering portion of the machine which is of a magnitude less than or equal to its actual width.

20. Apparatus as defined in claim 19, wherein the differencing means includes means for determining the area of the site traversed by the geography-altering portion of the machine between position readings, and means for updating the area of the second site model altered by the effective width of the geography-altering portion.

21. A method of directing the operation of a mobile geography-altering machine comprising the steps of:

(a) producing and storing in a digital data storage and retrieval means both a first three-dimensional geographic site model representing the desired geography of a site and a second three-dimensional geographic site model representing the actual geography of the site;

(b) generating signals representing in real time the instantaneous position in three-dimensional space of at least a portion of the machine as it traverses the site;

(c) updating the second model in accordance with said three-dimensional position signals;

(d) determining and updating the difference between the first and second site models in real time; and (e) directing the operation of said machine in accordance with the difference to bring the updated second site model into conformity with the first site model.

22. A method as defined in claim 21, wherein the three-dimensional position signals are generated by a GPS receiver.

23. A method as defined in claim 21, wherein the three-dimensional position signals are generated by means carried on the machine.

24. A method as defined in claim 18, wherein the machine includes a tool movable relative to the machine and the three-dimensional position signals are generated in response to the position of means carried on the tool.

25. A method as defined in claim 24, further including the step of providing the tool with means to determine the elevation of the tool relative to the surface of the site.

26. A method as defined in claim 21, wherein the step of directing the operation of the machine in accordance with the difference between the first and second site models includes providing an operator display of the difference between the first and second site models.

27. A method as defined in claim 26, further including the step of displaying the difference between the first and second site models in a plan view and a profile view.

28. A method as defined in claim 26, further including the step of displaying the difference between the first and second site models in a plan view.

29. A method as defined in claim 26, further including the step of displaying the difference between the first and second site models in a profile view.

30. A method as defined in claim 26, further including the step of displaying a real time position of the machine relative to the first and second site models.

31. A method as defined in claim 26, further including the step of providing the operator display on the machine.

32. Apparatus as defined in claim 26, further including the step of providing the operator display off the machine.

33. Apparatus as defined in claim 21, wherein the steps of updating the second model and determining the difference between the first and second models are carried out by means on the machine.

34. Apparatus as defined in claim 21, wherein the steps of updating the second model and determining the difference between the first and second models are carried out by means off the machine.

35. A method as defined in claim 21, wherein the step of directing the operation of the machine in accordance with the difference between the first and second site models includes the step of delivering a signal to control operation of one of a machine system and tool and bring the second site model into conformity with the first site model.

36. A method as defined in claim 21, wherein the machine is a site contouring machine, said first site model comprises a static three-dimensional model of the desired site geography, and the difference between the first and second models is determined as the elevation difference between the actual site geography and the desired site geography.

37. A method as defined in claim 21, wherein the step of updating the second model in accordance with the position of the machine includes the step of determining in real time the path of the machine relative to the site between the position readings.

38. A method as defined in claim 21, further including the step of determining an effective width for a geography-altering portion of the machine which is of a magnitude less than or equal to its actual width.

39. A method as defined in claim 38, further including the step of determining the area of the site traversed by the geography-altering portion of the machine between position readings, and updating the area of the second site model traversed by the effective width of the geography-altering portion.

40. A system for accurately monitoring and controlling the geography of a work site and machinery operating on the work site, comprising:

a mobile machine for going over or through and altering the geography of the site, the machine equipped with positioning means to accurately determine in real time the instantaneous position of at least a portion of the machine in three dimensions as it moves relative to the site;

a digital data storage facility in communication with the positioning means on the machine;

a first three-dimensional model of a desired site geography, and a second three-dimensional model of the actual site geography, the first and second site models stored in the digital data storage facility;

dynamic database means communicating with the digital data storage facility and the positioning means, the dynamic database means monitoring the position of the machine relative to the site in real time and updating the second site model in real time in response to the monitored position of the machine as it traverses the site, the dynamic database means further generating signals representing the updated real time difference between the first and second site models for directing the operation of the machine to bring the second updated site model into conformity with the first site model.

41. A system as defined in claim 40, further including operator display means for communicating said signals with the dynamic database means, and displaying the difference between the first and second site models and the position of the machine relative to the site.

42. A system as defined in claim 41, wherein the operator display is located on the machine.

43. A system as defined in claim 41, wherein the operator display is located off the machine.

44. A system as defined in claim 40, wherein the dynamic database means is located on the machine.

45. A system as defined in claim 40, wherein the dynamic database means is located off the machine.

46. A system as defined in claim 40, further including automatic control means on the machine in communication with the dynamic database means, the signals representing the difference between the first and second site models operating the automatic control means to bring the second site model into conformity with the first site model.

47. A system as defined in claim 40, wherein the positioning means comprise a GPS receiver.

48. A system as defined in claim 40, wherein the positioning means are mounted on the machine at a known position relative to a portion of the machine in contact with the site surface.

49. A system as defined in claim 40, wherein the machine includes a tool movable relative to the machine to alter the site, said positioning means being mounted to move with the tool.

50. A system as defined in claim 49, wherein the tool is further provided with a proximity detecting means to determine the elevation of the tool relative to the surface of the site.

51. A system as defined in claim 40, wherein the machine is provided with positioning means located at first and second spaced locations on the machine, said positioning means at the second location providing a directional reference relative to the positioning means at the first location.

52. A system as defined in claim 40, wherein the dynamic database includes differencing means for determining in real time the path of the machine relative to the site between position readings.

53. A system as defined in claim 52, wherein the machine includes a geography-altering portion of continuous width, the dynamic database means includes means for determining an effective width for the geography-altering portion which is of a magnitude less than or equal to its actual width, and the differencing means includes means for determining the path of the machine as a function of the effective width.

54. A system as defined in claim 52, wherein the differencing means includes a fill-in-the-polygon algorithm for determining the path traversed by a geography-altering portion of the machine between position readings.

55. A system as defined in claim 54, wherein the dynamic database means further includes means for updating the area of the second site model traversed by the geography-altering portion of the machine.

56. A method for determining the path in real time of a mobile geography-altering machine over a geographic site, comprising the steps of:

providing a model of the site geography subdivided into a continuous matrix of unit areas;

equipping the mobile machine with means for determining the position in three-dimensional space of at least a portion of the machine as it traverses the site;

tracking the position of the machine while it traverses the site as a series of coordinate points on the site model;

determining physical parameters of an operative portion of the machine as a function of the unit areas of the site model; and, determining a path of the machine relative to the site in real time, the path comprising the unit areas of the site model traversed by the operative portion of the machine between coordinate points.

57. A method as defined in claim 56, wherein the parameters of the operative portion of the machine are determined as effective parameters which are less than or equal to its actual parameters, and the path of the machine over the site as represented on the site model is determined by the path of the effective parameters of the operative portion.

58. A method as defined in claim 57, wherein the step of determining the effective parameters of the operative portion of the machine includes the step of determining an effective width of the operative portion which is less than its actual width.

59. A method as defined in claim 58, wherein the effective width is determined by locating each effective end of the operative portion of the machine from each actual end a distance corresponding to a fraction of the width of one unit area on the site model.

60. A method as defined in claim 58, wherein the operative portion of the machine comprises an earth-contouring blade of continuous width.

61. A method as defined in claim 58, wherein the operative portion of the machine comprises a plurality of geography-altering portions.

62. A method as defined in claim 57, further including the step of updating the geography of each unit area of the site model over which the effective parameters are determined to have passed.

63. An apparatus for determining the path in real time of a mobile geography-altering machine over a geographic site, comprising:

a model of the site geography subdivided into a continuous matrix of unit areas, stored in a digital storage facility;

a mobile machine equipped with means for determining the instantaneous position in three-dimensional space of at least a portion of the machine as it traverses the site;

means communicating with the digital storage facility and the position-determining means for tracking the instantaneous position of the machine while it traverses the site as a series of coordinate points on the site model;

means for determining physical parameters of an operative portion of the machine as a multiple of the unit areas of the site model; and, means for determining the path of the machine relative the site in real time, the path comprising the unit areas of the site model traversed by the operative portion of the machine between coordinate points.

64. An apparatus as defined in claim 63, wherein the means for determining the physical parameters include means for determining effective parameters of the operative portion of the machine which are less than or equal to its actual parameters, and the means for determining the path of the machine over the site as represented on the site model include means for determining the path of the effective parameters of the operative portion.

65. An apparatus as defined in claim 64, wherein the effective parameters of the operative portion of the machine comprise an effective width of the operative portion which is less than its actual width.

66. An apparatus as defined in claim 65, wherein the effective width is defined between effective ends of the operative portion of the machine spaced from each actual end a fraction of the width of one unit area on the site model.

67. An apparatus as defined in claim 65, wherein the operative portion of the machine comprises an earth-contouring blade of continuous width.

68. An apparatus as defined in claim 65, wherein the operative portion of the machine comprises a plurality of geography-altering portions of continuous width.

69. An apparatus as defined in claim 64, further including means for updating the geography of each unit area of the site model over which the effective parameters are determined to have passed.

70. A method for precisely determining the position of a machine in three-dimensional space relative to a land site using three-dimensional position signals and a digitized model of the site, and for displaying and directing the progress of work performed on the site by the machine, comprising the steps of:

(a) equipping the machine to receive position signals representing in real time the instantaneous position in three-dimensional space of a portion of the machine as it traverses the site;

(b) producing and storing in a digital data storage facility an actual site model representing the actual geography of the site, and a desired site model comprising a static three-dimensional model of a desired site geography, the actual model of the site geography subdivided into a continuous matrix of unit areas in a digital data storage facility;

(c) determining the physical parameters of an operative portion of the machine as a function of unit areas of the site model, the parameters of the operative portion of the machine comprising effective parameters which are less than or equal to its actual parameters;

(d) tracking the position of the machine while it traverses the site as a series of three-dimensional coordinate points;

(e) determining a path of the machine in real time comprising the unit areas traversed by the effective parameters of the operative portion of the machine between coordinate points;

(f) operating the machine on the site while simultaneously updating the actual site model in the storage facility in real time according to the path of the operative portion of the machine relative to the site, and displaying to the operator of the machine in real time the actual site model, the desired site model, a current difference between the actual and desired site models, and the position of the machine relative to the actual and desired site models.

71. A method as defined in claim 70, wherein the operator display means are located on the machine.

72. A method as defined in claim 70, wherein the operator display means are located off the machine.

73. A method as defined in claim 71, wherein the dynamic database means are located on the machine.

74. A method as defined in claim 71, wherein the dynamic database means are located off the machine, the apparatus further including means for transmitting signals representing the updated site model from the dynamic database means off the machine to the operator display means on the machine, and means for transmitting the position of the machine to the dynamic database.

75. An apparatus for precisely determining the position of a machine in three-dimensional space relative to a land site using three-dimensional position signals and a digitized model of the site, comprising:

(a) a mobile machine equipped with means for receiving the position signals and for determining the instantaneous position in three-dimensional space of at least a portion of the machine as it traverses the site;

(b) a model of the site geography stored in a digital data storage facility;

(c) dynamic database means communicating with the means for determining the machine position and the digital data storage facility, the dynamic database means including means for updating the site model in the storage facility in real time according to the three-dimensional position of at least a portion of the machine relative to the site, wherein the site model is an actual site model representing the actual geography of the site, and a desired site model is stored in the digital storage facility, the dynamic database means including means for determining in real time the difference between the actual site model and the desired site model as the actual site model is updated and for determining in real time the path of the machine relative to the site between position readings, the dynamic database including means for determining an effective width for the operative portion of the machine which is of a magnitude less than or equal to its actual width and means for updating the area of the second site model traversed by the effective width of the operative portion of the machine.

76. Apparatus as defined in claim 75, wherein the apparatus includes means for displaying the updated site model to an operator of the machine in real time.

77. Apparatus as defined in claim 76, wherein the operator display means are located on the machine.

78. Apparatus as defined in claim 76, wherein the operator display means are located off the machine.

79. Apparatus as defined in claim 77, wherein the dynamic database means are located on the machine.

80. Apparatus as defined in claim 77, wherein the dynamic database means are located off the machine, the apparatus further including means for transmitting signals representing the updated site model from the dynamic database means off the machine to the operator display means on the machine, and means for transmitting the position of the machine to the dynamic database.

81. Apparatus as defined in claim 53, wherein the dynamic database means further includes means for updating the area of the second site model traversed by the effective width of geography-altering portion the machine.

* * * * *